US011939162B2

(12) United States Patent
Douglas et al.

(10) Patent No.: US 11,939,162 B2
(45) Date of Patent: Mar. 26, 2024

(54) SYSTEM-DIRECTED ROBOTIC CART PICKING

(71) Applicant: Staples, Inc., Framingham, MA (US)

(72) Inventors: Matthew Robert Douglas, Orlando, FL (US); Stephen Nilsen, Clayton, NC (US); Paolo Gerli Amador, Framingham, MA (US); Gregory Patrick Cox, Sleepy Hollow, NY (US)

(73) Assignee: Staples, Inc., Framingham, MA (US)

( * ) Notice: Subject to any disclaimer, the term of this patent is extended or adjusted under 35 U.S.C. 154(b) by 524 days.

(21) Appl. No.: 17/173,115

(22) Filed: Feb. 10, 2021

(65) Prior Publication Data

US 2021/0245956 A1 Aug. 12, 2021

Related U.S. Application Data

(60) Provisional application No. 62/972,545, filed on Feb. 10, 2020.

(51) Int. Cl.
*B65G 1/137* (2006.01)

(52) U.S. Cl.
CPC .................................. *B65G 1/1375* (2013.01)

(58) Field of Classification Search
CPC .................................................... B65G 1/1375
See application file for complete search history.

(56) References Cited

U.S. PATENT DOCUMENTS

2012/0330458 A1* 12/2012 Weiss ............... G05B 19/41895 901/1
2017/0183159 A1* 6/2017 Weiss .................... B66F 9/0755
2018/0096299 A1* 4/2018 Jarvis ................... G05D 1/0285
2018/0127211 A1* 5/2018 Jarvis ................... G05D 1/0088
2018/0127212 A1* 5/2018 Jarvis ................... G05D 1/0234
2020/0242544 A1* 7/2020 Galluzzo ............. G05D 1/0088

* cited by examiner

*Primary Examiner* — Kyle O Logan
(74) *Attorney, Agent, or Firm* — VLP Law Group LLP; Michel Bohn

(57) ABSTRACT

A system-directed robotic cart picking system is described. In an example implementation, the system may generate a picking itinerary including pick-to-cart routing based on locations of items in an order fulfillment center and received order data identifying the items, and may transport the carts in the order fulfillment center according to the pick-to-cart routing. The system may determine a zone of the order fulfillment center to which to assign a picker based on the picking itinerary and may determine tasks, such as picking at least one item from the locations to the carts, for the picker located in the zone. In some instances, the system may output pick instructions to a picker client device directing the picker to perform the tasks and may transport the carts to a defined point in the order fulfillment center in response to completion of the tasks.

20 Claims, 13 Drawing Sheets

SYSTEM-DIRECTED ROBOTIC CART PICKING

BACKGROUND

This application relates to inventory management and order fulfillment systems. For example, aspects of this application relate to automated guided vehicles and other computing devices used in order fulfillment.

Some current inventory management systems use drag-along carts on which human agents (pickers) place items they select (pick) to fulfill orders. In a zone-less pick-to-cart system, an agent drags his/her cart from location to location to find items to pick into the cart.

The traditional inventory management systems do not coordinate mobile pickers with the movement of carts in a pick-to-cart system, particularly when mobile robots also are involved. Typically pickers are associated with a single cart and the system cannot dynamically adjust the locations, picking areas, or actions of pickers.

These systems lack the flexibility to allow pickers to be dynamically assigned and to coordinate with movement of other components of an order fulfillment system. These deficiencies lead to significant inefficiencies in resource utilization, imbalanced equipment workloads, and other problems.

SUMMARY

A storage fetching system can be configured to perform particular operations or actions by virtue of having software, firmware, hardware, or a combination of them installed on the system that in operation causes or cause the system to perform the actions. One general aspect of the system includes automated guided vehicles (AGVs) transporting carts or cartons, picker client devices, memories, and/or processors that perform operations including: generating a picking itinerary based on one or more locations of items in an order fulfillment center and received order data identifying the items, where the picking itinerary includes pick-to-cart routing for one or more carts; transporting the one or more carts in the order fulfillment center according to the pick-to-cart routing; determining a zone of the order fulfillment center to which to assign a picker based on the picking itinerary; determining one or more tasks for the picker located in the zone, where the one or more tasks include picking at least one of the items from the one or more locations to the one or more carts in association with the pick-to-cart routing; outputting pick instructions to a picker client device directing the picker to perform the one or more tasks; and, responsive to the one or more tasks being performed, transporting the one or more carts to a defined point in the order fulfillment center.

Some implementations may include one or more of the following features: that transporting the one or more carts in the order fulfillment center includes autonomously navigating a cart AGV according to the pick-to-cart routing using a guidance system; and/or that determining the zone of the order fulfillment center to which to assign the picker is based on the one or more locations of the items, where the one or more tasks include picking a subset of the items, which are located in the zone of the order fulfillment center. In some instances, the operations may further include determining a zone score for each of a plurality of zones, where the plurality of zones include the zone, and assigning the picker to the zone based on the zone scores. In some instances, the features may further include: that determining the zone score for each of the plurality of zones is based on a quantity of the one or more carts and a quantity of the one or more tasks; determining the zone score for each of the plurality of zones is further based on a distance between the one or more locations; and/or that determining the zone of the order fulfillment center is further based on locations of a plurality of pickers, where the plurality of pickers include the picker.

Some implementations may additionally or alternatively include one or more of the following features: that determining the zone of the order fulfillment center includes determining one or more boundaries of the zone using a clustering algorithm; that the pick instructions include instructing the picker to retrieve the at least one of the items from the one or more locations and place the at least one of the items on a certain cart of the one or more carts in coordination with the transportation of the certain cart to the zone by an AGV. In some instances, the operations may include: outputting zone instructions to the picker client device, the zone instructions directing the picker to move to the zone; receiving a confirmation message from the picker client device indicating that the one or more tasks have been completed, in response to receiving the confirmation message, reassigning the picker to a second zone of the order fulfillment center; and inducting an order into a storage fetching system based on the order data identifying the items in orders to be fulfilled at the order fulfillment center.

Other implementations of one or more of these aspects include corresponding systems, apparatus, computer processors, computer memories, and computer programs, configured to perform the actions of the methods, encoded on computer storage devices.

It should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

DESCRIPTION

Figure 1:
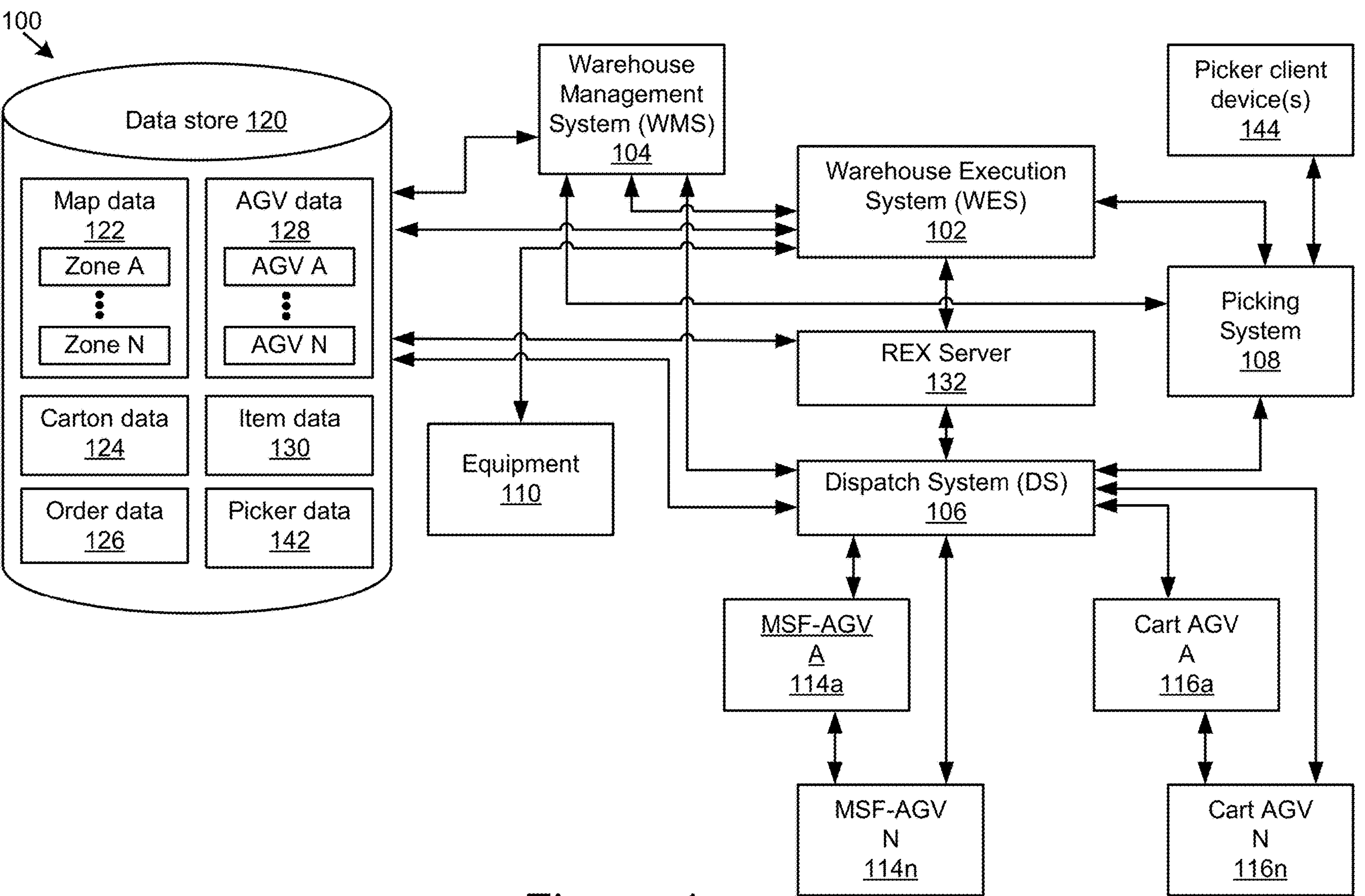
FIG. 1 is a block diagram of an example system and data communication flow for a storage fetching system for implementing system-directed robotic cart picking.

Among other benefits, the technology described herein improves upon that described in the Background Section. For instance, the technology provides robotic devices, systems, methods, and other aspects that can more efficiently process goods (e.g., items or items in an order fulfillment facility) based on demand. The technology may coordinate resources, such as automated guided vehicles (AGVs), conveyors, picking devices (e.g., robotic pickers or human pickers following instructions provided by a client device and system-directed tasks), and other equipment. For instance, the technology intelligently assigns pickers to areas, carts filled with cartons, and tasks within a facility, among other aspects.

Features of the technology described herein can be integrated into a logistics system, dispatch system 106, warehouse execution system 102, warehouse management system 104, a robot execution server 132, picking system 108, etc., to coordinate picking of items and fulfillment of orders from a fulfillment center. This technology beneficially improves productivity and throughput, increases asset utilization, and lowers cycle time and labor costs. These benefits, in turn, lead to shorter delivery times and result in significant time savings and efficiency for the equipment.

The technology herein may coordinate and balance multiple pickers in a facility to pick items to multiple carts, such as by directing picking computing devices associated with the pickers. For example, the technology may perform system-directed cart picking where optimal picks to one or more carts, cartons, or conveyors are chosen for a picker, for example, based on a distance between a next pick location (e.g., a location of a to-be picked item in storage) from a previous pick location, a current location of one or more pickers, or whether a cart has priority cartons (e.g., cartons that should be picked sooner or are in danger of missing a ship time). A picker may be a human or a robotic device capable of interacting with a picker client device 144 to receive instructions from the system and move items from storage or another location to a carton. For instance, a human worker may use a picker client device 144 to determine which item to pick, the location of the item, and where (e.g., in a particular carton carried by a cart) to place the item. It should be noted that this application uses the term "pick" to refer to a task, such as where an item is moved from a storage or other location into a carton, as described in further detail below. In some implementations, a pick location refers to a storage location of the item prior to being picked.

The technology may determine static or dynamic zones, areas, or sets of tasks to which to assign one or more pickers or in which picks, or other tasks, may be assigned to a certain picker. For example, zones may include locations items, cartons, carts (e.g., a cart AGV 116 may pass through a zone from which items are picked to an attached cart), pickers, or other tasks. The decision of where (e.g., which zone, which location, etc.) to send a picker may be based on a distance to a next pick location from a previous pick location, the current location of the picker and/or other pickers, priority of cartons, among other factors described below. For instance, the technology may (e.g., when a picker completes tasks in their assigned zone) identify and score zones based on these or other factors, which score may be used to assign the picker to another zone, redraw zones, and/or reassign tasks to the zone/picker. For example, when a picker finishes the last pick to which they have been assigned in their zone, the system may score zones and, based on the scores, send the picker to a new zone or redraw the boundaries (e.g., to include other picks) of their current zone. These and other implementations are described in further detail in reference to the figures below.

With reference to the figures, reference numbers may be used to refer to components found in any of the figures, regardless whether those reference numbers are shown in the figure being described. Further, where a reference number includes a letter referring to one of multiple similar components (e.g., component 000a, 000b, and 000n), the reference number may be used without the letter to refer to one or all of the similar components.

FIG. 1 depicts an example system 100 and data communication flow for implementing a storage fetching system 100. The system 100 includes a warehouse execution system (WES) 102. The WES 102 may be coupled to equipment 110 (e.g., conveyor controls, conveyor scanners, conveyors, automated induction equipment, other warehouse equipment, etc.), a warehouse management system (WMS) 104, a data store 120 storing warehouse management, execution, dispatch, picking, carton, order, item, AGV, map, and/or other data, a picking system 108, a robot execution system or server (REX) 132, and a dispatch system 106. Although the components of the system 100 are illustrated as being separate entities, they may be combined, subdivided, or rearranged without departing from the scope of this disclosure.

The WES 102 may, in some implementations, include one or more hardware and/or virtual servers programmed to perform the operations, acts, and/or functionality described herein. The components of the WES 102 may comprise software routines storable in one or more non-transitory memory devices and executable by one or more computer processors of the WES 102 to carry out the operations, acts, and/or functionality described herein. In further implementations, these routines, or a portion thereof, may be embodied in electrical hardware that is operable to carry out the operations, acts, and/or functionality described herein. Further, in some implementations, features or operations of components of the system 100 may be performed by other components.

The REX 132 may, in some implementations, include one or more hardware and/or virtual servers programmed to perform the operations, acts, and/or functionality described herein. For example, the REX 132 may include a picking agent that dynamically manages picking AGVs 114, a cart agent that dynamically manages cart AGVs 116, a management module that retrieves and stores information regarding AGV location, cartons, modular storage units 601, etc., in the data store 120, and an interface unit that interfaces with the other components of the system 100, according to the techniques described herein. The REX 132 may optimize workflow of picking AGVs 114 and cart AGVs 116, and dynamically manage resources and inventory, in conjunction with the WES 102, WMS 104, picking system 108, or dispatch system 106, etc., as described herein.

In some implementations, the REX 132 may generate a schedule or task list that defines the route for one or more AGVs or other equipment during a picking session. The REX 132 (or another component) may generate a task list, itinerary, schedule, or other command and transmit it to the dispatch system 106, which in turn deploys one or more picking AGV(s) 114, a cart AGV(s) 116, pickers, or other devices according to the schedule, for instance, depending on items to be picked from a high-density storage area 304 and/or pick-to-cart area 302. In some implementations, the dispatch system 106, based on instruction from the REX 132, instructs the AGVs to proceed through one or more of the picking zones of the order fulfillment facility according to the schedule. The schedule of the AGVs may be coordinated such that an optimal flow can be achieved, as discussed elsewhere herein. It should be noted that, in some instances, the REX 132 or another component of the system 100 may communicate with various other AGVs, equipment, conveyors, or devices in order to perform operations described herein.

In some implementations, the REX 132 may include or may communicate with a SKU (e.g., a stock keeping unit or unique identifier identifying an item) routing engine. The SKU routing engine is executable to route items into various storage zones depending based on picking profiles of the items, which may be stored and maintained as item data 130. The SKU routing engine dynamically monitors the picking activity in the order fulfillment facility, tracks which items have the highest volume or velocity for a given timeframe, stores the tracking data in the data store 120, and can instruct the REX 132 to have items relocated by AGVs to different storage locations in the order fulfillment facility based on the tracked picking activity.

A picking profile of a given item can change over time as demand for the item changes. The demand for a given item may be random or predicable (e.g., seasonal), and may change based on time of day, week, month, year, etc. The item routing engine may maintain the picking profile in the database as item data 130, and utilize that data to determine in which zone of the order fulfillment facility to store the item.

Advantageously, based on the picking profiles (e.g., velocity and volume), the SKU routing engine may provide a distinct automated application for picking. In some implementations, the SKU routing engine may continually algorithmically evaluate the picking profile of each SKU and instruct the WES 102 and dispatch system 106 to transfer/relocate items to another storage location and/or picking area, swap item locations, etc., when necessary to maintain the most expedient flow in the facility. This advantageously reduces capital associated with fully automated high velocity items and reduces replenishment complexity.

The WES 102 may store productivity information for points in the order fulfillment facility in a database (e.g., a non-transitory data store 120). The productivity information may reflect productivity capacity of that given point of the AGV system. In some cases, the productivity capacity may be dynamic based on current conditions (e.g., system health, staffing levels (e.g., number of associates working in zone), stock levels, operational state, etc.). The productivity information may be used as efficiency data, for example, to balance and coordinate devices.

In some implementations, the WMS 104, or another component of the system 100 may algorithmically analyze the configuration of a cart AGV 116 depending on items that are set for distribution/fulfillment in the next picking time window. The WMS 104 may generate a stocking list for the cart based on hub, priority, pick density, pick zone demand, and item-to-item affinity, etc. In some instances, the REX 132 may use the stocking list when generating the itinerary for the cart AGV 116.

The dispatch system 106 may be electronically communicatively coupled to a plurality of AGVs. In some implementations, the dispatch system 106, or elements thereof, may be integrated with or communicatively coupled with the REX 132. The dispatch system 106 includes hardware and software configured to dispatch the AGVs, and is coupled for communication the components of the system 100 to receive instructions and provide data between, for instance, the REX 132 and the AGVs 114 and 116. In some implementations, the dispatch system 106 may include AGV hardware drivers and controls, dispatch logic, AGV traffic management logic, and other hardware and software for communicating with and managing the AGVs.

The AGVs may include robotic vehicles including drive units providing motive force for moving the AGVs (and, in some instances, carts, modular storage units 601, AGV racks, AGV shelves, etc.), guidance systems for determining position of the AGVs within the order fulfillment facility, and equipment for carrying items. The equipment for carrying items may include carton holders, AGV shelves, modular storage unit holders, etc., such as carts, shelves, etc., as described in further detail in reference to FIGS. 5A-6, for example. FIGS. 5A-6 depict various types of AGVs, such as a picking AGV 114 (also referred to as a modular storage fetching (MSF) AGV) and cart AGVs 116.

A cart AGV 116 may include an automated guided vehicle or robot that may be configured to autonomously transport pick-to-cart items from a pick-to-cart area 302 of the order fulfillment facility to a pick-cell station 316 and/or finalizing area 314 (e.g., as described in reference to FIG. 3A), for example. The cart AGV 116 may include a drive unit adapted to provide motive force to the cart AGV 116 and a guidance system adapted to locate the cart AGV 116 in the order fulfillment facility. In some implementations, the cart AGV 116 is adapted to autonomously transport a carton holder (e.g., a cart or shelves) that is, in turn, adapted to hold cartons. Cartons may include, for instance, a box (e.g., a cardboard shipping box), tote, modular storage unit 601, or other container adapted to hold items. For example, a cart AGV 116 may push/pull a cart (e.g., a carton holder) holding cartons around a pick-to-cart area 302 and/or other areas of a distribution facility/fulfilment center and may automatically stop at storage bays or other locations of the pick-to-cart area 302 where items to be picked are stored, so that a picker in the pick-to-cart area 302 can place items into one or more of the cartons or modular storage units 601. In some instances, the cart AGV 116 may transport the cart to a pick-cell station 316 to receive additional items into the cartons from high-density storage (e.g., from modular storage units 601 in high-density storage, as described below). The cart AGV 116 may also navigate to/from the replenishment area 318, finalizing area 314, etc. In some instances, the cart AGV 116 may move at walking speed next to, behind, or in front of a picker walking through the order fulfillment facility. Additional details of example cart AGVs 116 are shown and described elsewhere herein.

A picking AGV 114*a* . . . 114*n* may include an automated guided vehicle or robot that may be configured to autonomously transport items from a high-density storage area 304 of the order fulfillment facility to a pick-cell station 316, replenishment area 318, and/or finalizing area 314. The picking AGV 114 may include a drive unit adapted to provide motive force to the picking AGV 114, a guidance system adapted to locate the picking AGV 114 in the order fulfillment facility, and a shelving unit, which may be adapted to hold modular storage units 601, containers, or other items. The picking AGV 114 may include a container handling mechanism (CHM) 616 (e.g., as shown in FIG. 6) that retrieves items or modular storage units 601 from storage shelves (e.g., in the high-density storage area), places items on an item holder (e.g., an AGV shelf) coupled with the picking AGV, and replaces items on storage shelves or at a pick-cell station. In some implementations, a picking AGV 114 may autonomously retrieve modular storage unit(s) 601 containing items to be picked in an order from the high-density storage area. For instance, the picking AGV 114 may transport the modular storage unit(s) 601 to a pick-cell station 316, so that a picker at the pick-cell station 316 can pick items from the modular storage unit(s) 601 and place them into containers in a cart. For example, a cart AGV 116 may transport a container to a bay in the pick-to-cart area 302 having a first item in an order, then to a pick-cell station 316 where a separate picking AGV 114 has delivered or will deliver a second item (e.g., in a modular storage unit 601) in the order, so that a picker can place the second item into the carton with the first item. The system 100 may coordinate the timing, placement, and movement of the cartons, modular storage units 601, pick-cell station 316 workload, and AGVs to bring cartons and modular storage units 601 having items corresponding to an order to the same pick-cell station 316 during the same time window, as described in further detail herein. Additional details of example picking AGVs 114 are described in reference to FIG. 6.

The WMS 104 may, in some implementations, include one or more hardware and/or virtual servers or software routines storable in one or more non-transitory memory devices and executable by one or more processors to perform operations, acts, and/or functionality described herein. The WMS 104 may be configured to store and maintain carton data 124 in the data store 120. The carton data 124 includes information about cartons and/or containers in the system, such as a unique identifier for each carton, a carton type, the zones a carton or cart will visit, the number of pick lines a carton or cart proceeds through, and/or the priority for the carton or cart. Some cartons may have a higher priority relative to other cartons and the system 100 may expedite handling of those cartons with higher priority relative to other cartons by the system 100. The carton data 124 may include a picklist defining the items the carton or cart will contain. The WMS 104 may store data mapping items to the different pick zones (e.g., the pick-to-cart area 302, the high-density storage area 304, a particular modular storage unit 601, a particular location at a particular pick-cell station 316, etc.). In some implementations, the WMS 104 may be configured to communicate the carton data 124 with the WES 102, the picking system 108, and/or dispatch system 106 in real time, in batches, as requested by these components, etc.

The picking system 108 may, in some implementations, include one or more hardware and/or virtual servers or software routines storable in one or more non-transitory memory devices and executable by one or more processors to perform the operations, acts, and/or functionality described herein. The picking system 108 may receive pick confirmations, for example, from pickers or operators (e.g., using barcode scanners, NFC, RFID chips, or other sensors or input methods) working within a pick zone (e.g., a pick-to-cart area 302, pick-cell station 316, etc.) confirming that picks for a given carton have been performed, as described in further detail below.

The picking system 108 may include or communicate with one or more computing devices having output devices, such as pick-to-voice or a pick-to-light system, graphical user interfaces, etc., for providing instructions and other information to pickers. For example, the picking system 108 may communicate with one or more picker client devices 144 used by pickers to communicate with the picking system 108. The picking system 108 may be configured to communicate the pick confirmation data with the WES 102, WMS 104, REX 132, or other components of the system in real time, in batches, as requested by the components of the system, etc.

The picker client devices 144 may include a speaker, display, computer, scanner, lights, augmented reality device, or other computing device capable of communicating with the picking system 108 and providing instructions to a picker. The picker client device 144 may include a mobile handheld device or wearable device. For instance, a picker client device 144 may include a smartphone (e.g., an Android™ or iOS™ device) communicatively coupled (e.g., via Bluetooth™) with an optical or RFID scanner. The picker client device 144 may receive and output to the picker instructions directing the picker to perform tasks such as moving to a different zone, picking items, placing items into certain cartons, etc. The use of the example picker client devices 144 described herein provide faster task execution, more relevant deployment, lower cost, decreased picker training, and less error-prone picks.

The picking system 108 may coordinate movement and tasks among a plurality of pickers using the picker client devices 144. In some implementations, each picker client device 144 may preload one or more (e.g., two) tasks and may download (e.g., from the picking system 108) a subsequent task during completion of the one or more preloaded tasks, so that there is no or minimal delay between tasks.

The picking system 108 may receive confirmatory input (e.g., pick confirmations) from pickers working within a pick zone (e.g., via a picker client device 144). The confirmatory input may confirm that picks for a given carton have been completed. The picking system 108 may transmit the confirmatory input to the WES 102 and/or the other components of the system 100. The confirmatory input may include the time stamp reflecting completion of the picks in the zone, a unique identifier identifying the picker (operator), a unique identifier identifying the pick zone, a unique identifier identifying the AGV, and/or a unique identifier identifying the carton (e.g. a carton number).

The data store 120 is an information source for storing and providing access to data. The data stored by the data store 120 may be organized and queried using various criteria including any type of data stored by it. The data store 120 may include data tables, databases, or other organized collections of data. An example of the types of data stored by the data store 120 may include, but is not limited to map data 122, AGV data 128, carton data 124, order data 126, modular storage unit data, picker data 142, location and/or timing data, itineraries, etc. In some implementations, the picker data 142 may include, conveying system attributes, picking data, picker attributes, sensor data, etc.

The data store 120 may be included in the WES 102, WMS 104, REX 132, or in another computing system and/or storage system distinct from but coupled to or accessible by the WES 102, WMS 104, REX 132, or other components of the system 100. The WES 102, picking system 108, REX 132, and/or dispatch system 106, for example, may store and maintain map data 122, order data 126, carton data 124, and AGV data 128. The data store 120 can include one or more non-transitory computer-readable mediums for storing the data. In some implementations, the data store 120 may store data associated with a database management system (DBMS) operable on a computing system. For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations.

The map data 122 may include data reflecting the 2 or 3 dimensional layout of the facility including the location of modular storage units 601, picking areas, lanes, equipment 110, storage shelving units, items, AGVs, etc. Map data 122 may indicate the attributes of the order fulfillment facility, including attributes of areas of the facility (e.g., one or more pick-to-cart areas 302, high-density storage areas 304, induction areas 308, finalizing areas 314, pick-cell stations 316, replenish stations, etc.). For example, attributes of zones may include the number, quantity, and location of shelving units or bays, modular storage units 601, items, guidance system locators or markers, etc. In some instances, the map data may include locations of items, picks, or other tasks, boundaries of zones, locations of pickers or other equipment, or other data.

The order data 126 includes data about picking including orders, items picked, items to be picked, picking performance, picker identities, pick confirmations, locations items are picked from, etc. Order data 126 may indicate the quantity and identity of items in orders, shipping addresses, order priority, progress of order fulfillment, number of cartons in an order, etc.

Item data 130 may describe items available for picking in an order fulfillment center/facility. The item data 130 may include unique identifiers for these items, the item volume (e.g., the total amount picked in given window (e.g., in an hour, day, etc.)), the item velocity (e.g., number of different times item picked in given window (e.g., per hour, day etc.), the unique location of the items within the order fulfillment facility (aisle, shelf, shelf position, etc.), other attributes of the item (e.g., size, description, weight, quantity of items in a package, color, etc.), item inventory, mapping of items of modular storage units 601, etc. In some implementations, the item data 130 may include the quantity of particular items a modular storage unit 601 contains, the current location of a modular storage unit 601, a storage location of items and/or modular storage units 601, a threshold inventory level of items to be satisfied before autonomously transporting the modular storage unit 601 to a replenishment area 318 by a picking AGV 114 (e.g., to restock the items in the modular storage unit 601).

The AGV data 128 may describe the state of an AGV (operational state, health, location, battery life, storage capacity, items being carried, cartons, etc.), whether picker assigned to it, etc.

In some implementations, the picker data 142 may include, conveying system attributes, picking data, picker attributes, sensor data, etc. Picker data may, in instances, include other data, locations, priorities, picker attributes, efficiency, zone assignment, task assignment, etc., used in the operations described herein.

The components of the system 100 may be coupled to exchange data via wireless and/or wired data connections. The connections may be made via direct data connections and/or a computer network. The computer network may comprise any number of networks and/or types of networks, such as wide area networks, local area networks, virtual private networks, cellular networks, close or micro proximity networks (e.g., Bluetooth, NFC, etc.), etc. In some implementations, one or more of these components may be coupled via a data communications bus.

It should be noted that although certain features and operations are described in reference to particular components of the system 100, these features and operations may be performed by different components of the system 100 or additional components without departing from the scope of this disclosure.

Figure 2A:
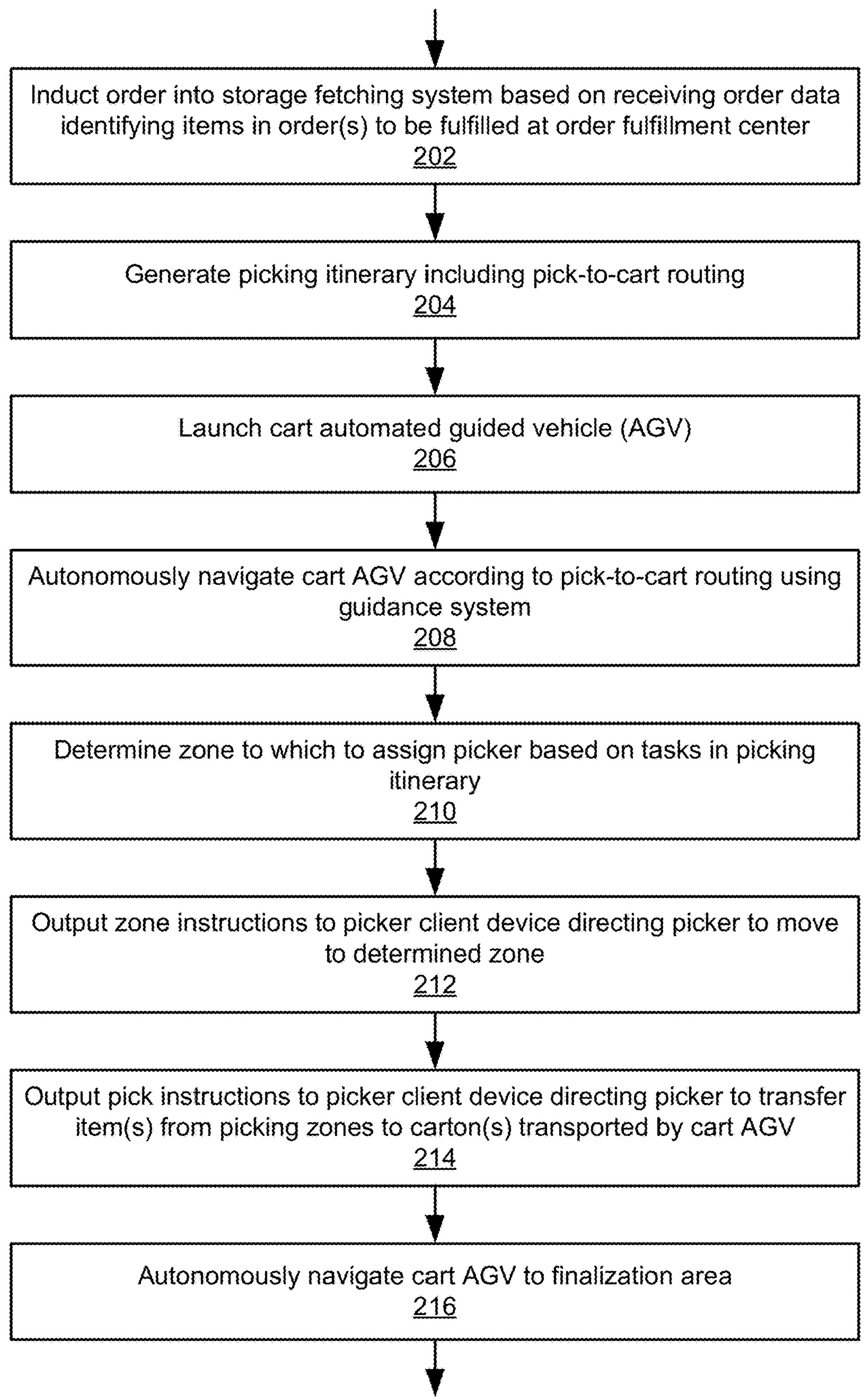
FIG. 2A is a flowchart of an example method for picking an order in a storage fetching system.

FIG. 2A is a flowchart of an example method for picking an order in a storage fetching system 100. It should be noted that although particular components of the system 100 are described as performing operations of the methods in FIGS. 2A-4C, the operations may be performed by different components or by multiple components.

In some implementations, at 202, the WMS 104 may induct an order into a storage fetching system 100 based on receiving order data identifying items in orders to be fulfilled at an order fulfillment center.

For instance, the order may be inducted in response to receiving order data identifying items in the order to be fulfilled at an order fulfillment center. For example, the REX 132, picking system 108, or another component may receive an induction instruction message from the WMS 104 including the order data and labels that describe cartons, items to be picked to using the cart AGV 116, items to be picked using a picking AGV 114, orders assigned to the cart AGV 116, a connectable cart, and/or cartons carried by the cart AGV 116. The picking system 108 may store the labels in association with the cart AGV 116 and/or a connectable cart coupleable to the cart AGV 116 in the data store 120.

In some implementations, for example, a user may place an order, and, in response, order data may be transmitted to the WMS 104, which may read the order and create cartons. For instance, the WMS 104 may divide the items in the order into cartons (e.g., boxes, totes, bags, modular storage unit or other pickable divisions, etc.), create or select cartons sizes, and print labels for the cartons. The order data 126 may include one or more first unique identification codes representing one or more first items located in a pick-to-cart area 302 of an order fulfillment center.

In some implementations, at 204, the picking system 108 may generate a picking itinerary or schedule including pick-to-cart routing for one or more carts, cart AGVs 116, or pickers. The picking itinerary may include a task list for fulfilling the order using a cart, for example, transported by a cart AGV 116. For instance, a cart may have a given quantity of cartons, each with one or more items to be picked into the cartons, and the picking system 108 may determine a sequence of tasks or picks for the cart(s), carton(s), and/or picker(s) for picking the items. It should be noted that although the cartons are described herein as being transported by carts and cart AGVs 116, in other implementations, a conveyor belt or other mechanism may be used to transport the cartons and/or items. Similarly, although tasks are generally described as including picks of items, other tasks such as placing packing slips, placing shipping labels, placing marketing materials, placing hazardous materials labels, taping cartons closed, or shipping cartons, among other tasks, may be performed. In some implementations, the itinerary may include a projected timing, based on the picks, projected time required to perform picks, and distance traveled, of the tasks. For instance, the picking system 108 may use the timing to coordinate timing of operations by pickers using the picker client devices 144.

In some implementations, the picking system 108 may generate a picking itinerary for each picker and/or zone, as described in further detail below. For example, the picking itinerary may include one or more tasks for each picker that are sent to a picker client device 144 to direct the picker to pick a certain item from storage and place it onto a cart, into a carton, or onto a conveyor, depending on the implementation. For instance, the picking system 108 may manage the pick-to-cart tasks for a certain cart in association with the picking tasks of a picker in order to coordinate the actions of the picker as the cart passes through a zone associated with the picker.

Pick-to-cart routing may describe routing of a particular cart AGV 116_a_ . . . 116_n_ and/or picker in a pick-to-cart area 302 or other part of the distribution facility. For example, the pick-to-cart routing may include a list of pick-to-cart items to be picked to the cartons transported by the cart AGV 116. The pick-to-cart routing may indicate the location of the storage units, shelves, or bays in which an item in the picking list is located. For example, the pick-to-cart routing may also include a defined route of a cart AGV 116 through these locations and an indication of locations at which to stop the cart AGV 116, so that a picker can pick items from adjacent storage units, shelves, or bays into the cartons transported by the cart AGV 116. The pick-to-cart routing may also include a schedule indicating when to pick items, when to deliver cartons to a particular pick-cell station 316, or when to travel to certain zones or locations.

The REX 132 or picking system 108 may generate a task list including tasks for fulfilling the order using one or more cart AGVs 116, picking AGVs 114, pickers, or other equipment. The task list may include a picking itinerary, as described above. For instance, in some implementations, the REX 132 may generate or update a task list to indicate a sequence of locations (e.g., where items in the order are located) to which a cart AGV 116 should navigate.

In some implementations, the REX 132, or another component of the system 100, may determine, based on load information in one or more of the pick zones, that a particular zone, picker, path, pick-cell station 316, etc., has a high traffic load. In response to such a determination, the REX 132 may dynamically adjust the routing schedule, for example, dictating which cart AGVs 116 are sent into different zones or areas of the order fulfillment center. For example, the REX 132 may determine that there is a threshold level of traffic in the pick-to-cart area 302, in response to which determination, the REX 132 may induct AGVs (e.g., cart AGVs 116 with particular orders to be filled) into the storage fetching system 100. Accordingly, in some implementations, the REX 132 may dynamically balance the load of various zones, AGVs, pick-cell stations, etc., in the system by adapting the composition (e.g., items from pick-to-cart versus from high-density storage) of orders/cartons on a particular AGV (e.g., a cart AGV 116), for example.

In some implementations, at 206, the REX 132 may launch a cart AGV 116 and a cart coupled with the cart AGV 116. For instance, launching a cart may include transmitting a signal to the dispatch system 106, which may dispatch a cart AGV 116 according to the picking itinerary. In some implementations, dispatching a cart AGV 116 may include creating cartons, assigning the cartons to a cart, associating a cart to a cart AGV 116, placing the cartons on the cart, and, in some instances, coupling the cart AGV 116 with the cart. For instance, the REX 132 or WMS 104 may assign orders (or items thereof) to cartons. Labels with unique identification codes identifying the cartons may be printed, placed on cartons, and the cartons may be placed on the cart at an induction area 308 by a picker, machine, or other device based on instructions from the system 100 (e.g., the picking system 108). The unique identification codes of the cartons may match, in the data store 120, the carton (and therefor the cart/cart AGV 116) with items to be picked.

In some implementations, at 208, the REX 132 may autonomously navigate a cart AGV 116 according to the pick-to-cart routing using a guidance system. The cart AGV 116 may autonomously navigate along a path through the pick-to-cart area 302 according to the pick-to-cart routing to retrieve one or more items located in the pick-to-cart area 302. As described elsewhere herein, the cart AGV 116 may use the guidance system to navigate and stop at designated areas for items stored in those areas to be picked to designated cartons. In some implementations, the cart, carton, cart AGV 116, storage area, or separate computing device (e.g., a picker client device 144) may include an output device that provides output indicating items to be picked at a particular location and, in some implementations, the output device may also include an input to receive pick confirmations. Once the pick confirmation has been received, the cart AGV 116 may autonomously move to the next area or zone to pick a subsequent item assigned to a carton on the cart.

In some instances, the REX 132 may instruct a particular cart AGV 116 to retrieve a first item of the order from the first storage area based on the task list. For example, the REX 132, or another component of the system 100, may determine that a particular item is in a set of items stored in a pick-to-cart area 302 of the order fulfillment center, determine the location of the item (e.g., in a zone or location within a zone), and instruct a next available cart AGV 116 to navigate to and retrieve the item from the determined location in the pick-to-cart area 302 (e.g., either automatically, or by issuing an instruction to a picker to pick the item to a carton held by the cart AGV 116).

In some implementations, at 210, the picking system 108 may determine a zone to which to assign a picker based on tasks in the picking itinerary. The assignment may be based on a computed zone score, which may be based on a distance to a pick location, current location of the picker and other pickers, or other factors. In some implementations, the picking system 108 may determine a zone and assign a picker as described in the example methods described in reference FIGS. 2B and 2C.

A zone of pick locations from which a picker picks items may be static or dynamic. For instance, a zone may be a defined area within the pick-to-cart area 302. In some instances, the size, shape, and/or location of a zone may be defined based on the locations of items to be picked (e.g., over a time period, at a specific time, etc.), the locations, numbers, or picking capacities/rates of pickers, or the physical configuration of the distribution facility. For example, a picker at a given location (e.g., determined or assigned by the location of an associated picker client device 144) may have a zone drawn around the picker based on proximity to other pickers and nearby tasks/picks. For instance, two pickers next to each other may be assigned to the same zone (e.g., with different tasks), overlapping zones, or adjacent zones (e.g., where the size, shape, or location of each zone is adjusted to not overlap with the other zone).

In some implementations, such as where pick locations are more closely clustered, the zones may be smaller and closer together so that pickers are more densely located as well. For example, a zone may be defined based on a quantity of picks, their attributes, and the location of a picker (although the picker may be instructed to move to a certain zone/location). For instance, the items, the sizes/weights, the distance between them and/or a carton (or cart, carton, cart AGV 116, conveyor, etc.).

In some implementations, at 212, the picking system 108 may output zone instructions to a picker client device 144 directing the picker to move to a determined zone or location. As described above, the picking system 108 may output an instruction on a display (or via audio, augmented reality, haptic feedback, etc.) of a picker client device 144. For example, the zone instructions may describe attributes of a zone, such as dimensions or location of a zone, when a picker should relocate to a zone, etc. In some implementations, a picker may not be aware of the zone in which the picker is located, but is merely instructed to move to a pick location, pick a certain item (or perform another task), and place the item in any carton (potentially including scanning the carton by the picker client device 144), in a certain carton, on a certain cart, on a conveyor, etc.

In some implementations, at 214, the picking system 108 may output pick instructions to the picker client device 144. The pick instructions may direct the picker to transfer one or more items from a defined zone/location to one or more cartons transported by a certain cart AGV 116, which may be coordinated, by the REX 132, to be proximate to the defined zone/location/picker. For example, the instruction may indicate which items and/or locations to pick and/or the cartons into which items may be picked, although instructions regarding other tasks are possible and contemplated herein. In some instances, the picking system 108 may receive confirmations that tasks are complete, repeat one or more of the processes for assigning a picker/zone, assigning tasks, and issuing instructions, etc., as described elsewhere herein.

In some implementations, the picker client device 144 may download multiple (e.g., two) tasks from the picking system 108, which the picking system 108 may intelligently determine, as described in further detail below. In some instances, in order to limit downtime, the picker client device 144 may download (or the picking system 108 may push to the picker client device 144) a new task in the background while one or more downloaded tasks are being performed to maintain a defined quantity of tasks downloaded to the picker client device 144. Additionally, this strategy may also improve system efficiency and decrease bandwidth used by pushing data to picking client devices by spreading out transmitted data and avoiding the need to update the data (e.g., in response to tasks or zones changing from pick to pick).

In some implementations, at 216, the REX 132 may autonomously navigate the cart AGV 116 to a finalization area 314 or other defined point (e.g., a next pick, as described elsewhere herein). For instance, if no further picks are associated with the cart, the REX 132 may instruct the cart AGV 116 to transport the cart to a next designated location, which may be a finalization area 314 where packing slips, marketing material, hazmat labels, tape, etc., are added to cartons or where cartons are shipped. In some implementations, the picking system 108 may designate the finalization area 314 or portions thereof as part of a zone and assign a picker to that zone. The picking system 108 may transmit instructions to the picker client device associated with the picker directing the picker to perform tasks, such as place hazmat labels (and confirm their placement), remove cartons from the cart, or other tasks.

In some implementations, once items in the pick-to-cart storage area 302 have been picked (e.g., as described elsewhere herein) to the cart AGV 116, the cart AGV 116 may autonomously navigate to an assigned pick-cell station 316 or to a finalizing area 314 according to the pick-to-cart routing. In some implementations, the cart AGV 116 may decouple from the cart and leave the cart at the pick-cell station 316, a particular zone, or at a finalizing area 314, so that the cart AGV 116 may transport another cart while the first cart is being filled with items, for example.

Figure 2B:
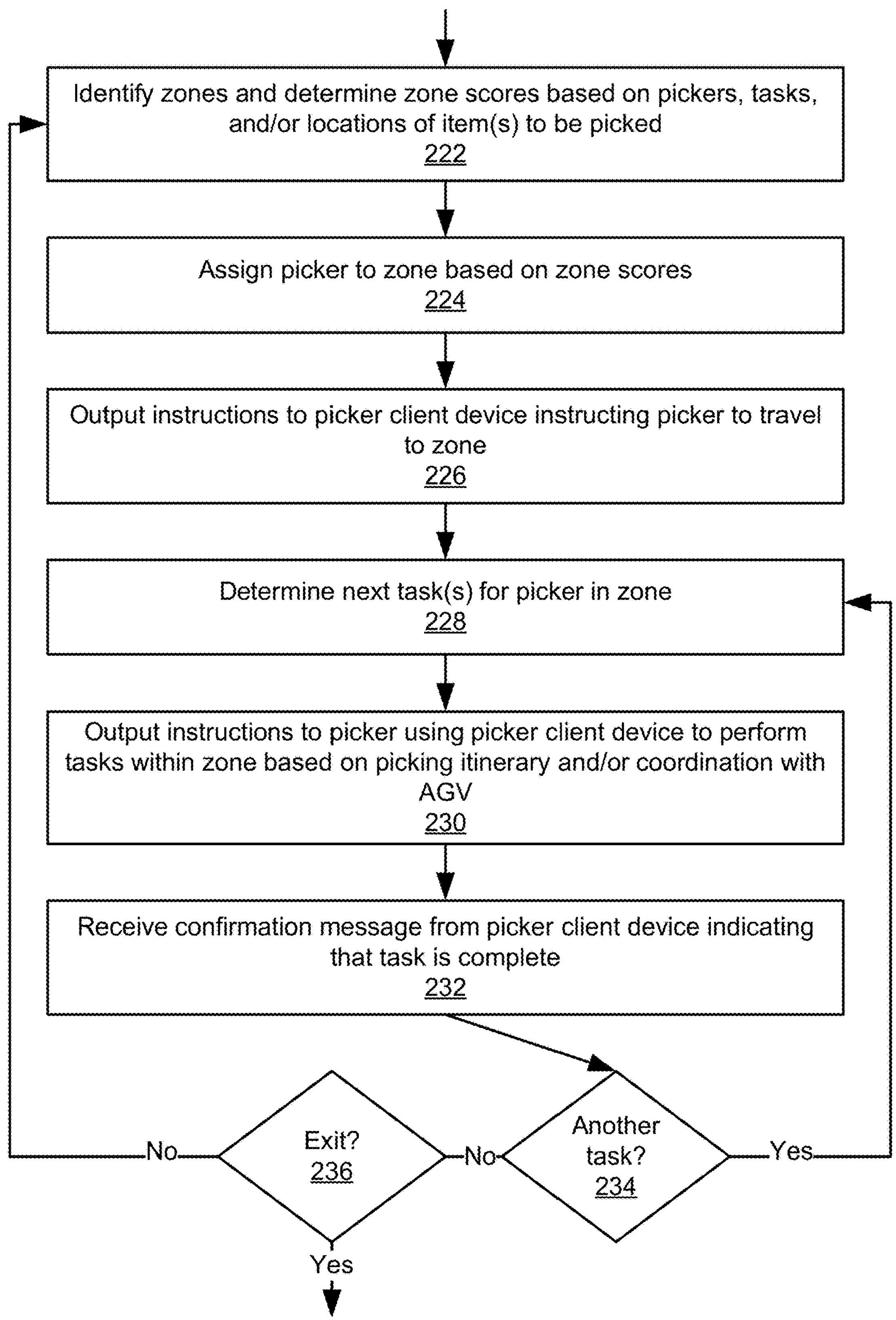
FIG. 2B is a flowchart of an example method for assigning tasks and/or zones to pickers.

FIG. 2B is a flowchart of an example method for assigning tasks and/or zones to pickers. In some implementations, at 222, the picking system 108 may identify zones and determine zone scores for each of a plurality of zones, for example, based on pickers, tasks, and/or locations of item(s) to be picked, as described elsewhere herein. For example, the picking system 108 may determine the zone scores as described in further detail below in reference to FIG. 2C.

In some implementations, the picking system 108 may identify static or dynamic zones. For instance, a facility may have statically defined zones based on areas of shelving, conveyors, density of items that may be picked, etc. In some implementations, the picking system 108 may dynamically identify and/or define a zone. For example, the picking system 108 may determine, using a clustering algorithm, one or more boundaries of a plurality of zones based on locations of items to be picked, tasks, and/or other attributes. Zones may include various locations of tasks to be performed, such as picks from locations of items in the fulfillment center. Accordingly, the zones may be defined by the quantity and/or locations of picks/tasks or a set of tasks may be defined based on the zone.

In some implementations, the picking system 108 may identify zones in a warehouse or distribution facility based on a quantity or attributes of tasks, available pickers, and/or carts. In some instances, identification or definition of zones may also be based on locations of picks, tasks, carts, and pickers or other aspects of an operating environment. For example, the picking system 108 may determine the quantity and locations of the items to be picked (e.g., during a given period) and may divide up the picks based on a quantity of available pickers and/or their locations. The zone may include a group of shelving bays from which a picker would pick items and place them into one or more cartons transported by one or more cart AGVs 116 in the zone. Accordingly, a picker may perform tasks for a number of carts together to increase pick density through that zone, for example, by reducing the distance that the picker would walk and familiarity with locations of items in the zone. For example, the timing of the tasks performed by the picker may be scheduled to coordinate with a timing at which the cart is located at the zone, at a particular location in the zone (e.g., nearest the picks), or near the picker.

In some implementations, the picking system 108 may identify or define zones dynamically, for example, using a clustering algorithm such as k-means, auction, mean-shift, centroid, density-based, other clustering algorithms, or a combination of algorithms (e.g., k-means in conjunction with an auction algorithm). For instance, the picking system 108 may adjust the size, shape (e.g., boundaries), or location of zones based on a quantity and location of picks, so that zones for each picker have roughly balanced workload. The picking system 108 may balance the workload of pickers, etc., based on distance traveled between picks, distance traveled from storage locations to cartons (e.g., on cart AGVs 116), quantity of items, etc.

For instance, the picking system 108 may use a clustering algorithm, such as K-Means (although other suitable clustering algorithms also exist), for determining a locus for a picker. The boundary lines of a zone may be drawn to separate each cluster and/or balance the number of picks and/or distance of travel for each picker. In some instances, the picking system 108 may also take the efficiency of a picker into account when balancing workloads, for example, a time to completion may be balanced instead of or in addition to balancing distance and quantity of picks for zones. In some implementations, the ordering and/or selection of tasks/picks may be selected (in a facility, in a zone, for a picker) using another machine learning algorithm, such as an auction algorithm, which may determine a shortest path among pick locations thereby improving selection and/or ordering of tasks/picks in a zone.

Depending on the implementation, the picking system 108 may draw a new zone around each picker and/or change the location of the picker periodically (e.g., after a set time, after a set quantity or percentage of picks have been performed, etc.) based on where a picker is in relation to other pickers and to prevent pickers from sharing picks and allow them to have a balanced workload. For instance, the picking system 108 may determine locations of one or more picker client devices 144 associated with picker(s) and use these locations in directing the pickers' actions.

In some implementations, at 224, the picking system 108 may assign the picker to a determined zone based on zone scores of zones. The picking system 108 may assign users based on a scoring algorithm (e.g., to a zone with a highest score), such as described in reference to FIG. 2C.

In some implementations, a picker may be assigned (e.g., using a picker client device 144) to or sign in to a single priority cart that, along with its cartons and tasks, may be removed from the other zone-based scheduling and computations of the picking system 108 described herein, so that the single picker may follow the cart and cart AGV 116 through multiple zones to prioritize the priority cart/cartons.

In some implementations, at 226, the picking system 108 may output instructions to a picker client device 144 instructing a picker to travel to the determined zone or location therein. For example, as described above, the picking system 108 may identify the zone to which a picker is assigned. In some instances, a picker may scan (e.g., using a picker client device 144) the cart when it enters the pick zone, thereby registering it to the picker client device 144. In some instances, the picking system 108 may permit pickers to travel backward a defined distance (e.g., a quantity of shelving bays or docks, a defined distance) to interact with other carts outside the zone.

In some instances, the REX 132, picking system 108, or another component of the system may push tasks to a cart AGV 116 and/or picker client device 144 to coordinate their operations based on their locations at a given time. For instance, the REX 132 may instruct a cart AGV 116 with a pick at a certain location to navigate to or near that location. The picking system 108 may also transmit an instruction to the picker client device 144 instructing the picker to take the item(s) from that location and place it on the cart, although other implementations are possible.

In some implementations, at 228, the picking system 108 may determine a next task for the picker in the zone. For instance, as described above, the picking system 108 may define a sequence via which tasks are to be performed. For instance, the picking system 108 may select a task and transmit a message identifying the task to the picker client device 144. A subsequent pick could be picked to the same or a different cart and/or carton.

In some implementations, the picking system 108 may determine the sequence of tasks to be performed by the picker based on reducing a total distance traveled by the picker to complete the tasks/picks. In some implementations, the picking system 108 may assign multiple picks (e.g., based on a carrying capacity of a picker, apron, cart, bag, etc.) to a picker at a time to further reduce distance traveled by the picker and increased pick density.

In some implementations, the task list/sequencing may be based on a distance from a previous pick location to a next pick location, the current location of other pickers, priority cartons or tasks, location of cart AGV 116, or other factors, as described below.

In some implementations, upon being assigned to a zone, a picker may start picking at the nearest location for a cart (e.g., a first bay within a zone at which the cart arrives) and may move through the zone picking items to the cart(s). If multiple pickers are picking carts within the same zone, the picking system 108 may divide the carts (and associated tasks) among the pickers based on a distance of the cart into the zone or otherwise modify the quantity of carts assigned to each picker to balance the quantity or time-consumption of tasks.

In some implementations, at 230, the picking system 108 may output instructions to a picker using a picker client device 144 to perform tasks within the zone based on the picking itinerary and/or in coordination with an AGV 116, conveyor, or other pickers/equipment. For instance, as described above, the picking system 108 may output, using a picker client device 144, instructions to the picker to perform tasks within the zone based on a task list (e.g., itinerary, schedule, or sequence). In some implementations, a picking system 108 may determine and a picker client device 144 may pre-load tasks to reduce downtime, as described above.

In some implementations, at 232, the picking system 108 may receive a confirmation message from the picker client device 144 indicating that a task, such as a pick, attachment of label, etc., has been completed. For instance, the picker client device 144 may scan an item or pickup location and a carton, cart, cart AGV 116 to indicate that a pick of the item to the carton has been completed. In response to receiving the confirmation message, the picking system 108 may move to the next task for the picker and/or cart, for instance, the picking system 108 may transmit data describing the next task for the picker to the picker client device 144 (or for a second picker to a second picker client device 144).

In some implementations, at 234, the picking system 108 may determine whether there is another task (e.g., pick) in the zone, assigned to the picker, or assigned to the cart, for example. If, at 234, the picking system 108 determines that there is another pick in the zone, the picker/picker client device 144 may proceed to the next task, which may be a pick of an item at the nearest location.

As tasks/picks are completed for the cartons on a given cart, the REX 132 may instruct a cart AGV 116 to transport the cart to the next zone in which a task is assigned (e.g., based on the picking itinerary) for the cart or to a finalization area 314, for example. In some implementations, a cart or carton may pass through several zones and/or receive interaction by several pickers before all of the picks to the cart or carton are complete. For instance, once the tasks for the cart in a first zone are completed, the REX 132 may direct a cart AGV 116 to navigate to a second zone where a second picker completes additional tasks in that second zone respective to the cart AGV 116.

In some implementations, if the picking system 108 determines that a picker has finished the tasks in their zone, the tasks currently assigned, or some other trigger, it may assign the picker to a new zone, for example, based on a zone score. For instance, upon completion of the tasks in the zone (or another time period), the picking system 108 may score all other zones, as described elsewhere herein. Based on the calculation, the picking system 108 may instruct the picker to stay with the cart(s) into the next zone, or to travel to another location based on the zone score (e.g., the zone score of other zones for the picker).

In some instances, a picker may remain in an assigned zone as several carts (e.g., transported by cart AGVs 116) pass through the zone and various tasks/picks assigned to the picker/zone may be performed respective to different carts, for example, based on the specific items assigned to be picked to that cart or a carton thereon.

If there is not another task in the zone or cart, for example, the method may continue to 236 to determine an exit condition, which may be the last task of a picking session, a time limit, a final pick, or other condition. If it is determined that there are additional picks in the system, the method may return to 222, for example, by identifying zones, assigning a picker to a zone, etc., as described above.

Figure 2C:
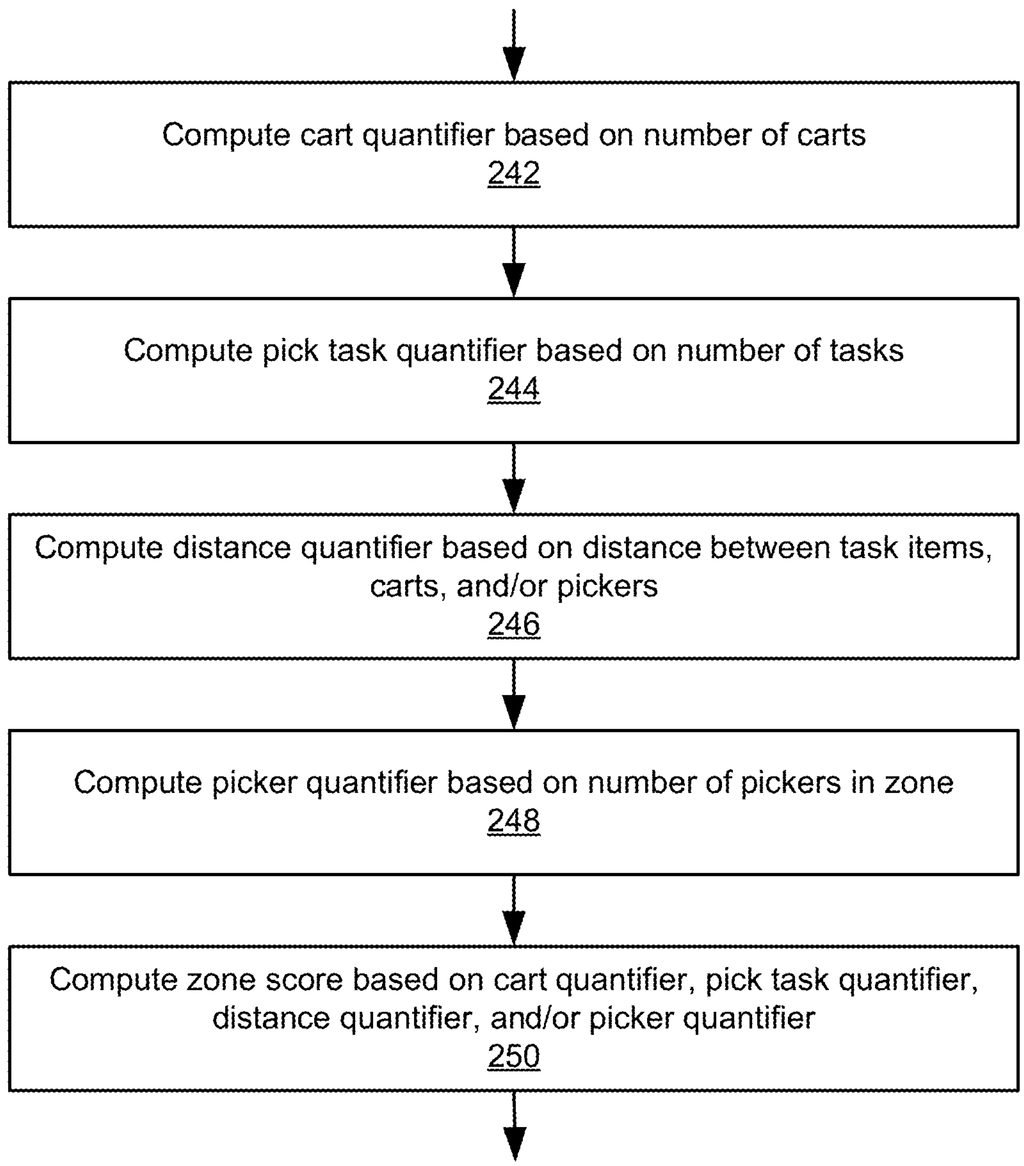
FIG. 2C is a flowchart of an example method for assigning zones to pickers using a scoring algorithm.

FIG. 2C is a flowchart of an example method for assigning zones and tasks to pickers using a scoring algorithm. In some implementations, the scoring algorithm weights zones with more tasks, lines, and/or carts higher, while zones that are further away lower, and/or zones that already have pickers lower. In some instances, the picking system may reduce the scores based on the number of pickers that are already in the zone. For instance, the picking system 108 may reduce the score by subtracting a constant or by dividing by the number of eligible tasks, lines, or carts, pickers, etc., as described below. Based on these and/or other factors, the picking system may determine a total score for each zone. In some instances, the size, shape, and/or location of the zone(s) may be determine based on the scores, for example, to balance the workload (e.g., indicated by the scores) of zones. Depending on the implementation, the picking system 108 may perform one or more operations of the method of FIG. 2C to determine the optimal zone for a particular picker (e.g., by assigning the picker to the highest scored zone). It should be noted that the operations and equations described in reference to FIG. 2C may be reconfigured, revised, weighted, etc., without departing from the scope of this disclosure.

In some implementations, the picking system 108 may use the following relationship (1) to produce a zone score for a given zone:

$$x_i^{zs} = \frac{k_c n_c^{zs}}{\left(1 + k_{pc} n_p^{zs}\right)} + \frac{k_l n_l^{zs}}{\left(1 + k_{pl} n_p^{zs}\right)} - d_{s,f} - k_p n_p^{zs} \quad (1)$$

Where the variables of the relationship may be defined as:

$x_i^{zs}$: The current picker's score for the calculated zone.

$k_c$: A configurable constant for how effective the number of carts in a zone affects the score.

$n_c^{zs}$: The number of carts in this zone.

$k_l$: A configurable constant for how effectively the number of lines in a zone affects the score.

$n_l^{zs}$: The number of picks/lines/tasks in this zone.

$d_{s,f}$: The score distance from dock point s to dock point f. Where S, the starting point, is the last pick the picker just completed. Where F, the final point, is the initial dock point of the first pick in the zone. This element is configurable, and the score can be different depending on the direction of travel.

$k_p$: A configurable constant for how effectively the number of pickers already within the zone affects the score.

$n_p^{zs}$: The number of pickers already in this zone.

$k_{pc}$: A configurable constant for how the number of pickers already in a zone affects the score of the number of carts in a zone.

$k_{pl}$: A configurable constant for how the number of pickers already in a zone affects the score of the number of lines/tasks in a zone.

In some implementations, at 242, the picking system 108 may compute a cart quantifier based on a number of carts. The cart quantifier may include a division factor if there are multiple pickers and may increase if there are multiple cartons and if there are multiple picks for a carton. For instance, the cart quantifier may be based on a number of carts in or assigned to an area or zone, a number of pickers in a zone, various weights, and/or other factors.

In some implementations, the cart quantifier may be defined as (2), where the factors are described above:

$$\frac{k_c n_c^{zs}}{\left(1 + k_{pc} n_p^{zs}\right)} \quad (2)$$

In some implementations, at 244, the picking system 108 may compute a pick task quantifier based on a number of tasks, so that each picker is assigned an appropriate number of picks. For instance, the pick task quantifier may be based on a number of tasks/picks for a zone, picker efficiency, a number of pickers in a zone, various weights, and/or other factors.

In some implementations, the pick task quantifier may be defined as (3), where the factors are described above:

$$\frac{k_l n_l^{zs}}{\left(1 + k_{pl} n_p^{zs}\right)} \quad (3)$$

In some implementations, at 246, the picking system 108 may compute a distance quantifier based on a distance between task items, carts, and/or pickers. The distance quantifier may help prevent a picker from walking too far by subtracting out the quantifier and reducing the score if the picker would have to travel too far to get to a new zone. For instance, the distance quantifier may be based on distances between picks, distances between carts and picks, total distances traveled by a picker and/or cart when performing a set of tasks, and/or other factors.

In some implementations, the distance quantifier may be defined as (4):

$$d_{s,f} \quad (4)$$

In some implementations, at 248, the picking system 108 may compute a picker quantifier based on a number of pickers in each zone. The picker quantifier may be used to help prevent an excess of pickers in a given zone. For instance, the picker quantifier may be based on picker effectiveness, weights, a number of pickers in a zone, and/or other factors.

In some implementations, the picker quantifier may be defined as (5):

$$k_p n_p^{zs} \quad (5)$$

In some implementations, at 250, the picking system 108 may compute a zone score for each zone based on the cart quantifier, the pick task quantifier, the distance quantifier, and/or the picker quantifier. For instance, the picking system 108 may use the relationship (1) to determine a zone score. For example, a total zone score may be based on a number of carts in/assigned to a zone, a number of tasks in a zone, a distance traveled by a picker and/or cart AGV 116, a quantity of pickers, and/or other factors.

Figure 3A:
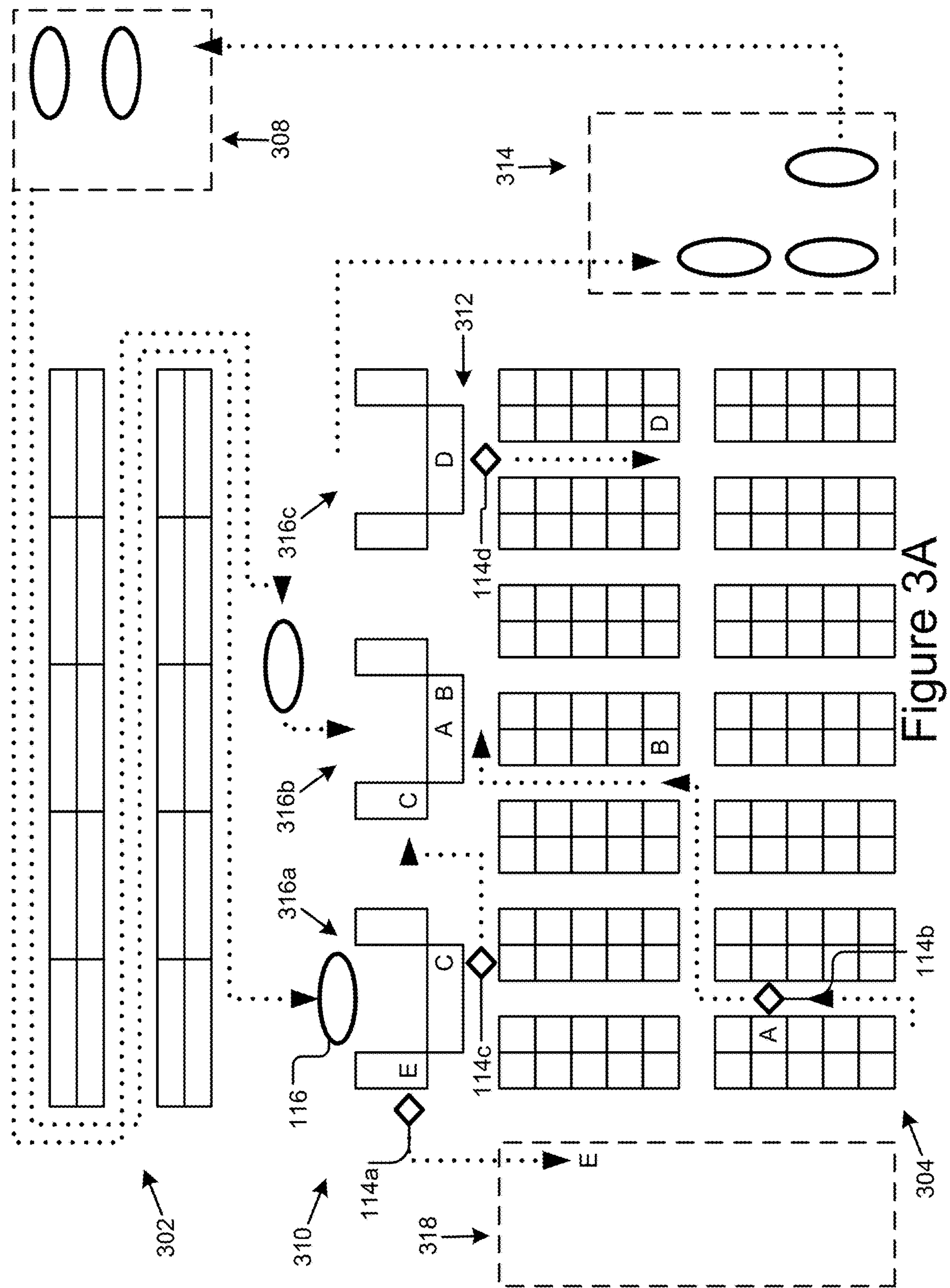
FIG. 3A is a schematic of an example configuration of a distribution facility layout.

FIG. 3A depicts a schematic of an example configuration of an order fulfillment center, which may be an operating environment of AGVs, pickers, or other equipment. In some instances, some or all of the operating environment may be divided into one or more zones, as described above. It should be understood that various distribution facilities may include different picking zones having different stocking infrastructure and picking configurations. For instance, high-volume and/or velocity items (e.g., items appearing above a defined threshold of frequency in orders) may be stored in a pick-to-cart area 302 and be available for immediate picking, and relatively moderate and/or low-volume and/or velocity items may be stored in high-density storage area 304 on modular storage units 601 which may be retrieved by picking AGVs 114 for an upcoming pick.

The layout depicted in FIG. 3A includes various areas: an induction area 308, a pick-to-cart area 302, a pick-cell area 310, a pick-cell staging area 312, a high-density storage area 304, a finalizing area 314, and a freight or modular storage unit elevator (not shown) for multi-level access when the layout includes multiple floors. In some cases, the layout may include multiple levels of mezzanine with one or more of the different zones/areas. In some implementation, cart AGVs 116 are staged in the induction area 308 and are set up for picking sessions. In some implementations, cartons are assembled, labeled with unique scannable visual identifiers to associate them with specific orders, and are placed on the supports (e.g., cart shelves) of the cart AGVs 116 in the induction area 308.

The pick-to-cart area 302 is configured for high-velocity and/or volume items and advantageously reduces resources used to handle this type of item class. Inventory may be stored in high-volume storage in containers or pallets, for example. High velocity items may be divided into pick zones, each zone may include one or a plurality of bays (e.g., 4, 5, 6+), which may be balanced by the SKU routing engine and/or picking system 108 based on demand. Cart AGVs 116 may be scheduled by the REX 132 to autonomously visit these zones, and pickers accompanying the cart AGVs 116 may be guided by the picking hardware (e.g., pick-to-voice and/or pick-to-light) controlled by the picking system 108. In an example, a cart AGV 116 is instructed by the REX 132 to stop directly in front of a bay location. The cart AGV 116 may self-locate using a guidance system. For example, the guidance system may include guidance system locators or markers, such as guide tape (magnetic, colored, etc.), laser target navigation, inertial navigation, vision guidance, geolocation, QR codes on the floor of the order fulfillment center, RFID (radio frequency identification) tags, beacons, etc., that can be used to locate and navigate AGVs in the order fulfillment center. Further, the AGVs may include guidance system components configured to read the guidance system locators, such as a QR code reader, wireless radio, etc.

After the picker picks the item and confirms the pick with the picking hardware, the cart AGV 116 autonomously moves to the next assigned location or bay until the picks are complete. As shown in FIG. 3A, a cart AGV 116 has the capability to bypass zones, bays, shelves, etc., without picks. Each zone can have dedicated cart AGV 116 accumulation or queue before the zone to reduce cycle time.

The picking station area may include pick-cell stations 316*a*, 316*b*, and 316*c* situated along primary path(s) via which the cart AGVs 116 are routed. In FIG. 3A, the pick-cell stations 316 are situated opposing a portion of the pick-to-cart area 302 and the cart AGVs 116 may be routed to visit one or more of these pick-cell stations 316 depending on the items that need to be picked and placed in the cartons of these cart AGVs 116. In the case that in given cart AGV 116 does not require any items from the picking station area, it may bypass it entirely and proceed to the finalizing area 314. In some implementations, a zone to which a picker may be assigned, as described elsewhere herein, may include a picking station 316.

In some implementations, fora given picking session, the REX 132 may establish a single line picking configuration for high-priority tasks in which the picker and the cart travel through an inventory pick path along a single line until the picks are fulfilled. In further implementations, such as for regular priority cartons, a carton and/or cart may pass through zones and receive picks, as described elsewhere herein.

The layout may also include a replenishment area 318 in which modular storage units 601 are replenished with items. For instance, item inventory in a given modular storage unit 601 may be replenished by a picking AGV 114 that picks the modular storage unit 601 from static shelves and transports them to the replenishment area 318 where a case may be opened and items from the case placed directly into the modular storage units 601.

The modular storage units 601 storing items may be moved by picking AGVs 114 from high-density storage area 304 into a staging area 312 and staged for movement into a pick-cell station 316 for an upcoming pick. In some implementations, the storage units of faster-moving items may be moved directed to a pick cell 382 in a given pick-cell station 316.

FIG. 3A also illustrates example paths of AGVs through the order fulfillment center. The paths are represented by dotted lines, cart AGVs 116 are represented by ovals, and picking AGVs 114*a* . . . 114*d* are represented by diamonds.

Example cart AGV paths are illustrated in FIG. 3A, for example, a cart AGV 116 may navigate from an induction area 308 on a path through the pick-to-cart area 302 and then to one or more pick-cell stations 316. Once the picks for the cart AGV 116 have been completed, it may navigate to a finalizing area 314 where cartons are prepared for shipment, for example. Once the cartons have been removed from the cart AGV 116, the cart AGV 116 may return to the induction area 308 to start through the process again.

Example picking AGV paths are also illustrated in FIG. 3A, for example, a picking AGV 114*a* may transport a modular storage unit E from a first pick-cell station 316*a* to a replenishment area 318 for replenishment. A picking AGV 114*b* may retrieve a first modular storage unit A from a first location, navigate to a second location, retrieve a second modular storage unit B, and transport both the first and second modular storage units A and B to a pick-cell station 316*b*. A picking AGV 114*c* may retrieve a modular storage unit C from a first pick-cell station 316*a* and transport it to a second pick-cell station 316*b*. A picking AGV 114*d* may retrieve a modular storage unit D and transport it back to the high-density storage area 304. It should be understood that these paths and implementations are provided as examples and that other combinations are possible and contemplated herein. For example, one or more picking AGVs 114 may perform some or all of the paths illustrated as well as others not illustrated in FIG. 3A. Further, as described elsewhere herein, the automation of the picking AGV 114 may be performed in synchronization with other actions (e.g., automation of cart AGVs 116, picking sessions or windows, movement of other AGVs or pickers, etc.) in the storage fetching system 100.

Figure 3B:
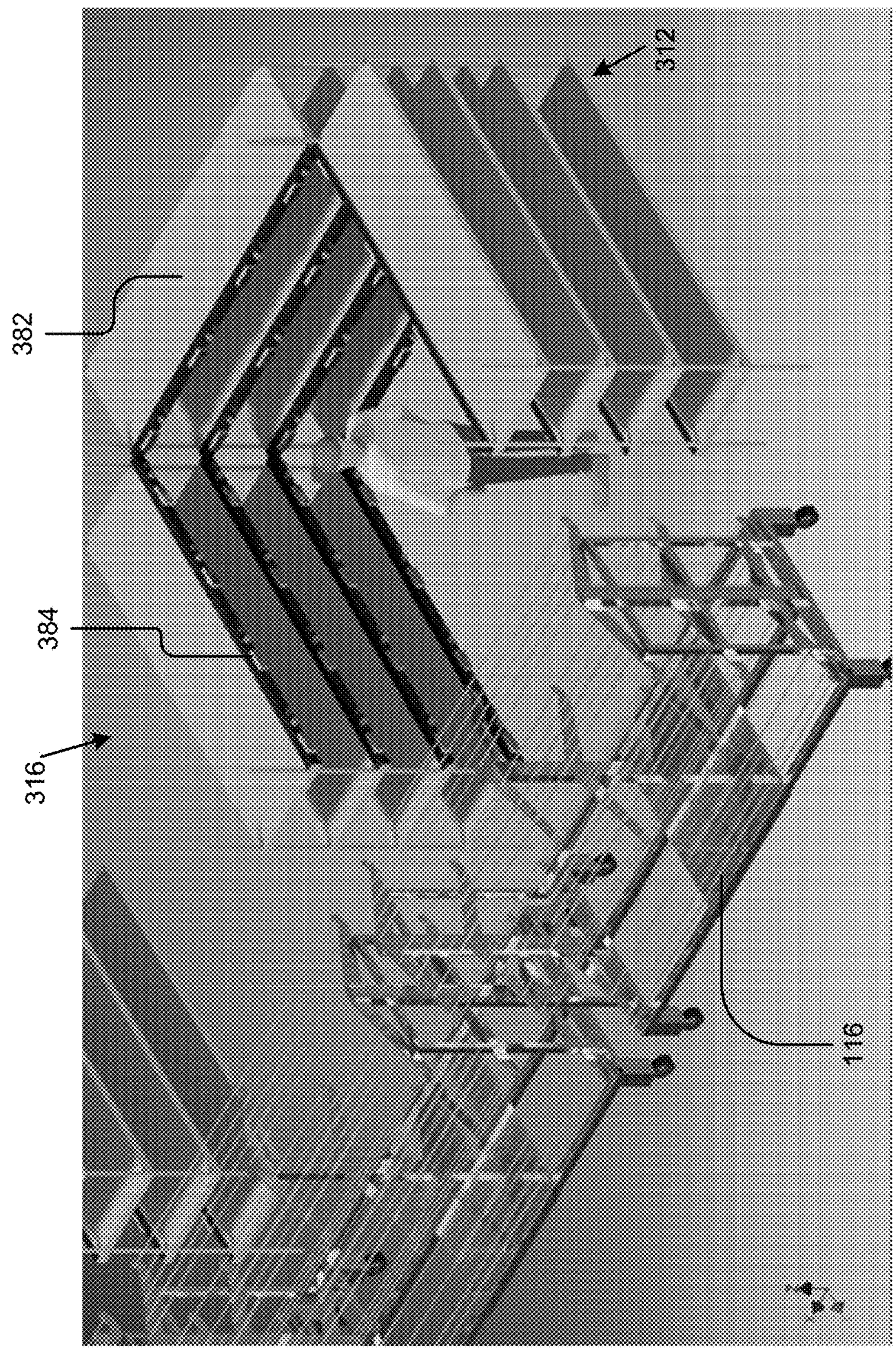
FIG. 3B is an illustration of an example goods-to-person or pick-cell station in a distribution center.

FIG. 3B is an illustration of an example pick-cell station 316. Each pick-cell station 316 may include one or more pick cells 382. A zone from which items are picked to a carton, cart, or cart AGV 116 may include a pick cell station 316. The pick cells 382 are a temporary storage mediums (e.g., shelves, bays, etc.) for the modular storage units 601 (e.g., mini pallets, totes, modular storage racks, etc.) and modular storage units 601 may be storage containers that can be picked up or tugged and transported by a picking AGV 114. In some cases the pick-cell station 316 may include an output device, such as a pick-to-light frame, for carts, that matches the locations of the cartons in the cart and/or a put or pick-to-light frame 384 for the pick cells 382 to indicate the locations of modular storage units 601 to use for a particular pick. For instance, a pick-cell station 316 may include an output device configured to provide picking instructions to a picker, the picking instructions indicating to the picker which of the items in the modular storage units 601 to place in a carton held on the carton holder of the cart AGV 116.

One or multiple of the pick cells 382 may be organized into a staging area 312 around a picker in a pick-cell station 316, so that modular storage units 601 can be easily accessed by the picker. In some implementations, a picking AGV 114 may be configured to stage the modular storage units 601 at the staging area 312. For instance, a picking AGV 114 may approach from the rear of a pick cell 382 and stage (e.g., place, deliver, etc.) a modular storage unit 601 on the pick cell 382. In some implementations, a modular storage unit 601 may be associated by the picking system 108 with a particular location in the staging area 312 to more precisely direct a picker to the location of the modular storage unit 601 (e.g., using a pick-to-light or other output system).

At a given pick-cell station 316, a cart AGV 116 may arrive and situate itself on one side of the station with the cartons on the cart AGV 116 facing the picker. On the other sides of the station are pick cells 382 in which modular storage units 601 situated and from which the picker may select items to fulfill the orders associated with the cartons. The modular storage units 601 may contain one or more items, types of items (e.g., represented by different universal product codes or stock keeping units), etc.

Figure 3C:
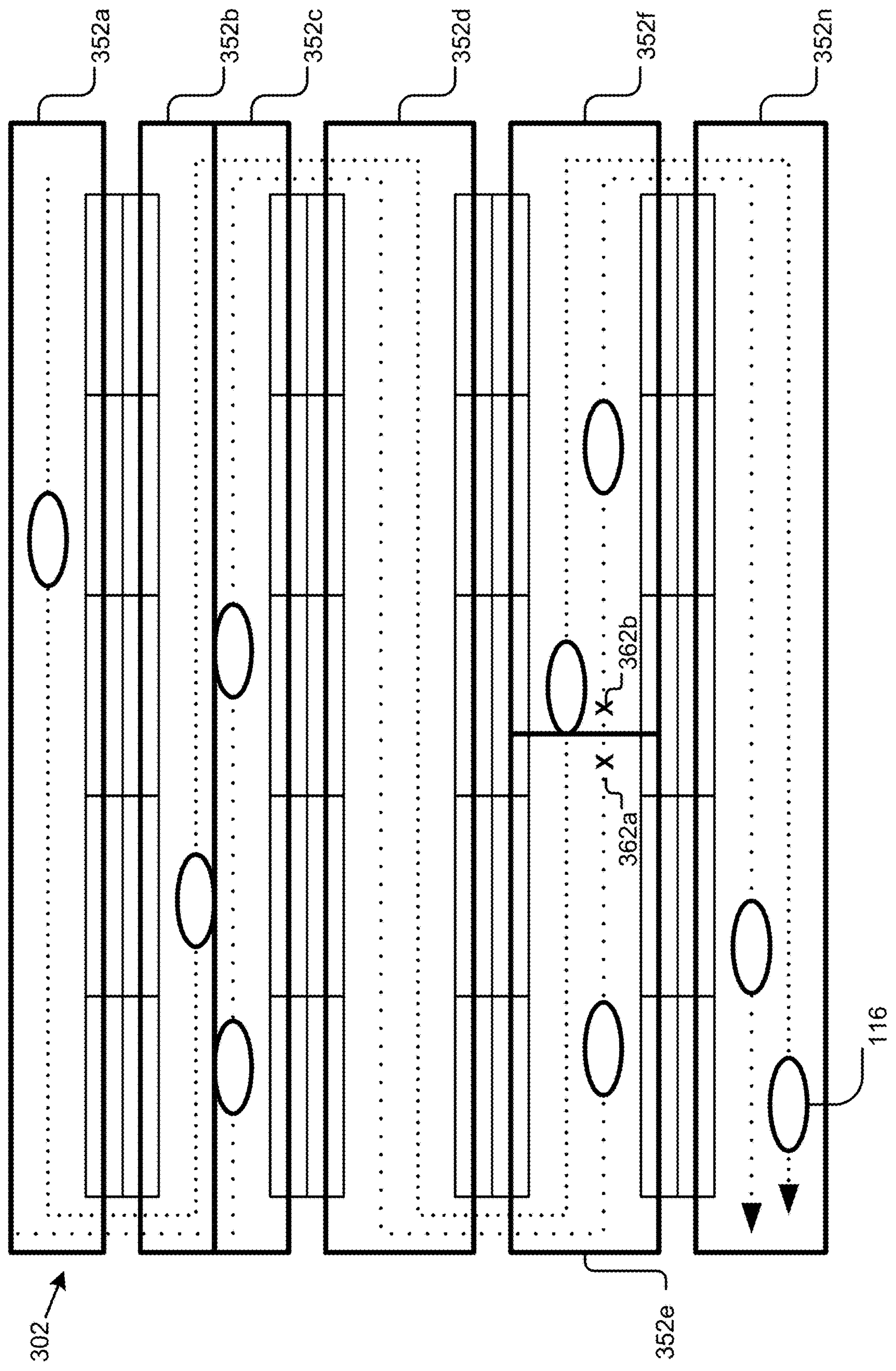
FIG. 3C depicts a schematic of an example configuration of a pick-to-cart area divided into zones.

FIG. 3C depicts a schematic of an example configuration of a pick-to-cart area 302 that may be divided into zones 352*a*-352*n*. As illustrated, one or more cart AGVs 116 may pass through the zones 352 and may receive items, for example, placed on the cart by pickers following system-directed instructions from a picker client device 144. One or more of the zones 352 may include one or more pickers serving the cart AGVs 116 that pass through their zones 352. It should be noted that, as described above, zones may be static or dynamic and may be based on attributes of the facility, the set of items to be picked, the set of tasks, locations of pickers, etc., as described elsewhere herein.

For instance, zones 352*a* and 352*b* may each have a single cart AGV 116 (although carts, cartons, etc., may be otherwise transported), and an approximately equal quantity or distribution of picks. Accordingly, the picking system 108 may define the zones 352*a* and 352*b* to be similar in size (e.g., the boundaries thereof may be redrawn) and/or assign similar quantities or efficiencies of pickers to the zones 352*a* and 352*b*. Similarly, the zone 352*c*, which may have two cart AGVs 116 during a given time window, may have pickers assigned based on the quantity of cart AGVs 116 and/or picks in the zone 352*c*. Zone 352*d* may be defined to be larger and/or may have no pickers assigned thereto if there are no cart AGVs 116 therein and/or no picks in a time window, for example.

The boundaries of zones may be dynamic. For example, as described above, the boundaries of the zones 352*e* and 352*f* may be drawn based on pick/task locations, locations/quantities of cart/cart AGVs 116, physical configurations of shelves, bays, or aisles, and/or locations of pickers, etc. For instance, when two pickers are located near each other (e.g., at points 362*a* and 362*b*), the picking system 108 may define the boundaries of the 352*e* and 352*f* outward from the pickers to encompass different pick/task locations. Similarly, the picking system 108 may define the boundaries of the zone 352*n* to be larger than other zones (e.g., 362*a*) because it has fewer picks or a more efficient picker assigned thereto during a time window, for example.

It should be noted that the example of FIG. 3C depicts cart AGVs 116, which may transport carts and/or cartons, but it should be understood that other implementations are possible. For example, the items may be picked onto a conveyor, into cartons on a conveyor (the locations and timing of which may be coordinated in the same way described in reference to the cart AGVs 116), another type of AGV (e.g., a picking AGV 114), or another cart or piece of equipment.

Figure 4A:
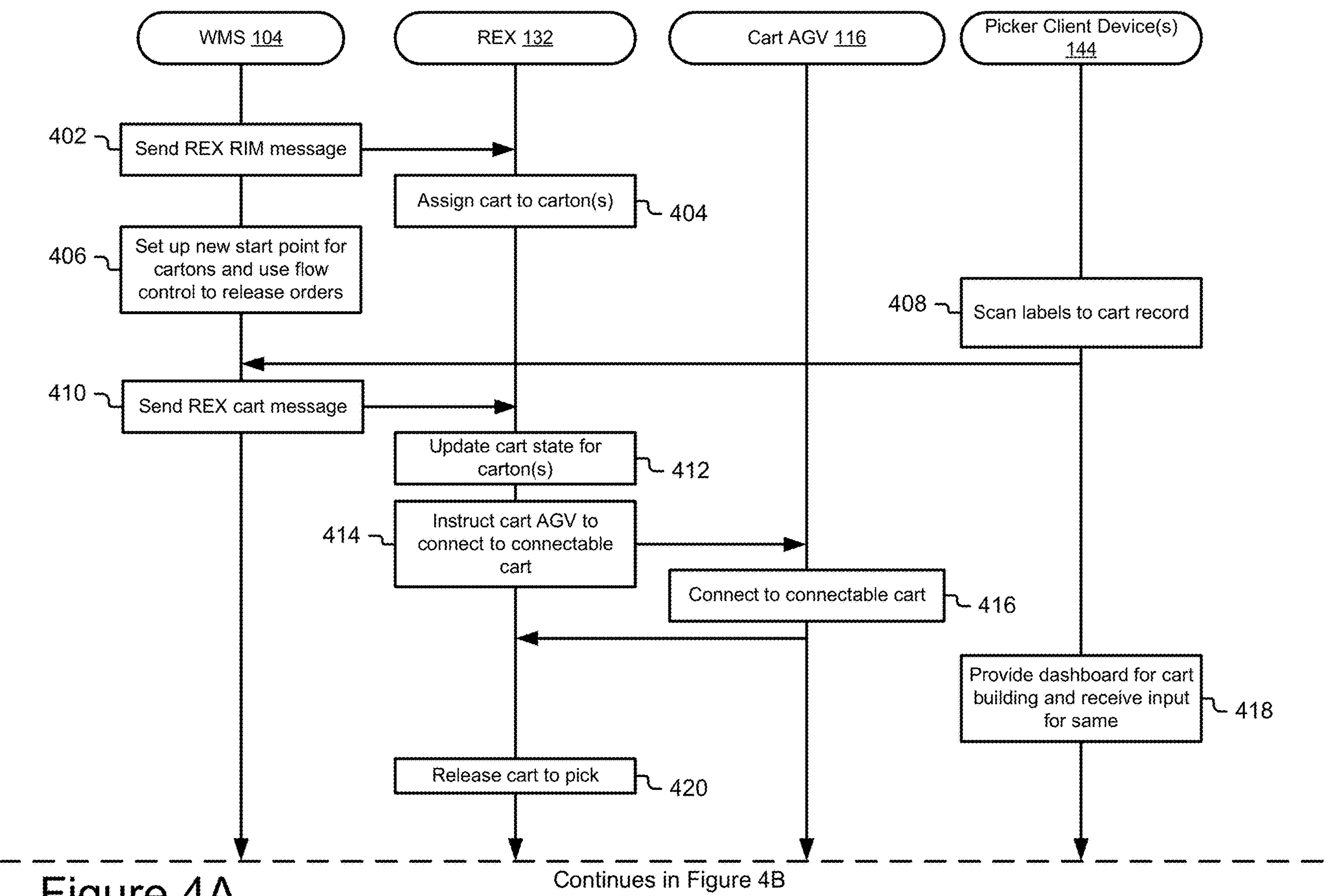
FIGS. 4A-4C are signal diagrams illustrating example interactions between components of a storage fetching system to implement system-directed cart picking.
Figure 4B:
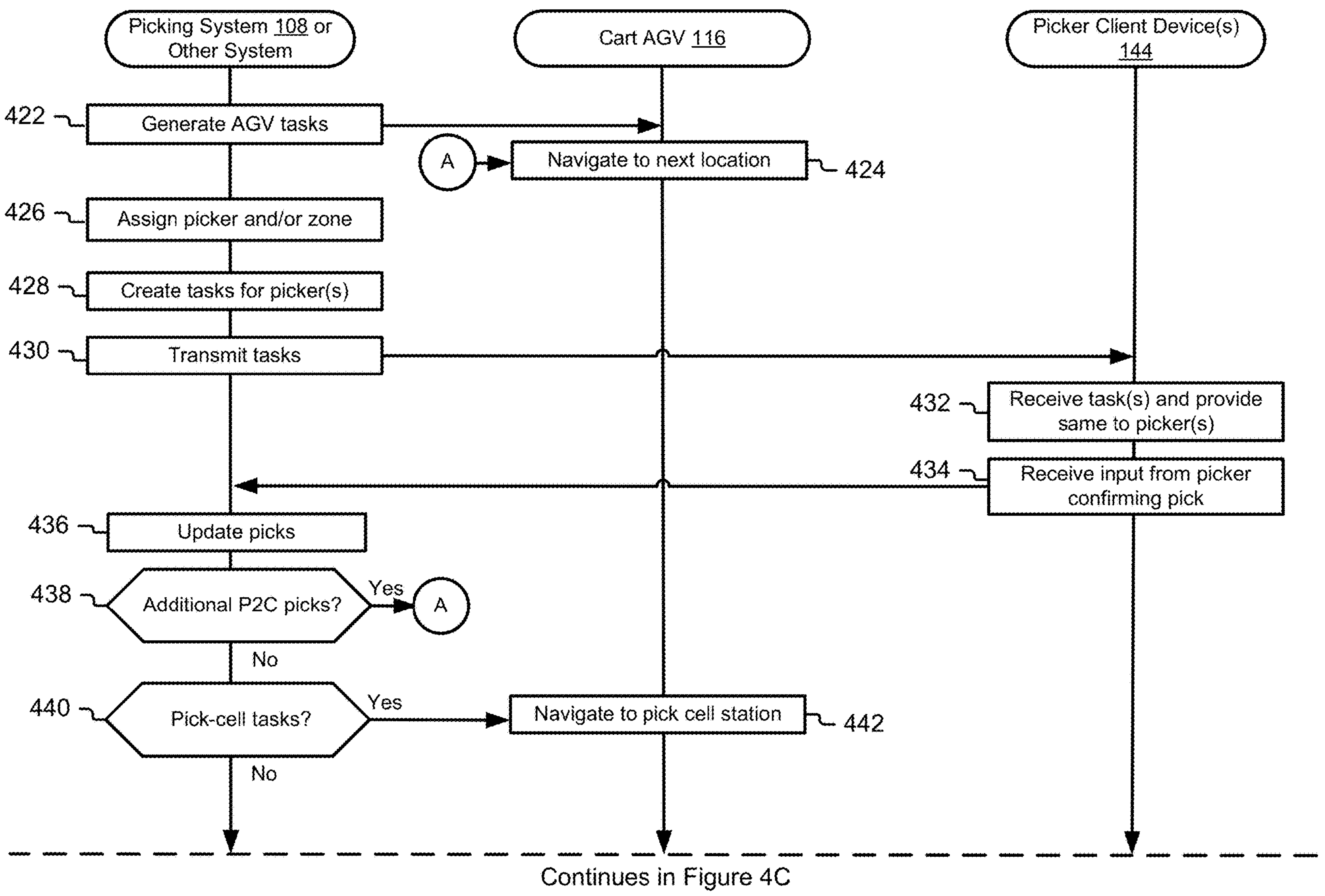
Figure 4C:
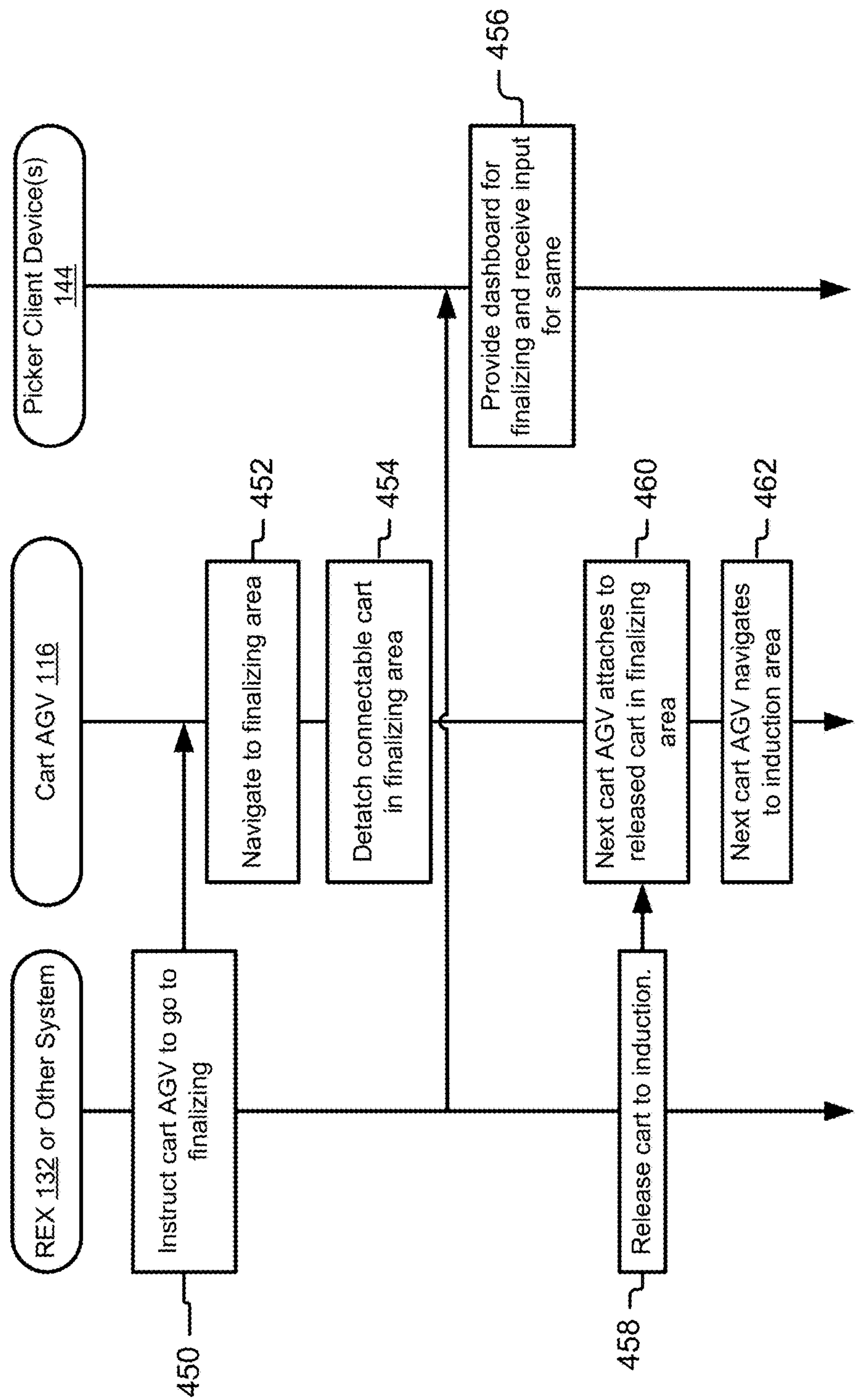

FIGS. 4A-4C are data-flow diagrams of an example method of managing AGVs and pickers using a REX 132, picking system 108, and/or other components of the system 100. The WES 102 or WMS 104 may receive an order including items for distribution/fulfillment. The order may be reflected in order data 126 having a unique identification code (e.g., unique product codes, stock keeping units, etc.) for an item and a quantity associated with that item. The order may be assigned a carton (e.g., of a particular size, dimension, etc.) for picking and/or shipping or, in some instances, split into multiple cartons. At 402, the WMS 104 may send a robot information message (RIM) to the REX 132. The RIM message may indicate to the REX 132 that one or more cartons are being to be inducted into the system, for example, by identifying the cartons in one or multiple orders and, in some instances, items in the cartons. The RIM message may include order details, carton numbers, lines in an order, SKUs in an order, quantities of SKUs in an order, or other information for inducting an order into the system.

At 404, the REX 132 may assign a cart to the cartons and, in some instances, store the carton information received in the RIM message in the data store 120. In some implementations, the cart may include a connectable cart, which may be assigned to a cart AGV 116, for instance, based on an availability of the cart AGV 116, proximity of the cart AGV 116 to an induction area 308, availability or location of a connectable cart, size or other attributes of the connectable cart, or another criteria.

At 406, the WMS 104 may set up a new start point for cartons and use flow control to release orders. For instance, the WMS 104 may assign items to the carton(s) assigned to a cart AGV 116. For instance, the one or more orders assigned to the cart AGV 116 (e.g., to the connectable cart) may each be assigned to one or more cartons. In some implementations, releasing the orders may include printing labels with unique identifiers (e.g., QR codes, bar codes, stock keeping units, tracking codes, etc.) and/or creating the cartons and placing them on the cart of the cart AGV 116.

At 408, a picker client device 144 or other device may receive input scanning the labels to a cart record of the cart (e.g., using voice input or other input of the picking system 108). For instance, a picker in the induction area 308 may scan the labels using an optical scanner, which is coupled with the WMS 104. The WMS 104 may then associate, in a cart record, the unique identifier of the labels, the order(s), the items in the order(s), and the cart/cart AGV 116, for instance.

At 410, the WMS 104 may send a cart message to the REX 132. The cart message may indicate the labels assigned to the cart/cart AGV 116, thereby identifying the orders assigned to the cartons on the cart/cart AGV 116. In some instances, the message may identify one or both of the items in each order that are stored in the high-density storage area 304 and the pick-to-cart area 302.

In some implementations, the RIM message and the cart message may be sent as separate messages or may be combined into an induction instruction indicating one or more first items in each order assigned to the cart AGV 116 to be picked using the cart AGV 116 and one or more second items in each order to be picked using the picking AGV 114. It should be noted that some orders may include only items located in the pick-to-cart area 302 or items located in the high-density storage area 304 of an order fulfillment center without departing from the scope of this disclosure.

At 412, the REX 132 may update the cart state and/or carton information for the carton(s), for instance, to indicate that the labels have been assigned to the cart/cart AGV 116, and, in some implementations, may instruct a cart AGV 116 to connect to a connectable cart at 414.

At 416, in response to receiving the instruction from the REX 132, the cart AGV 116 may navigate to a location of the cart (e.g., in the induction area 308) and mechanically couple with the cart, so that the cart AGV 116 may push or pull the cart through the order fulfillment center. For example, a cart AGV 116 may include a coupling mechanism that detachably couples the cart AGV 116 to a connectable cart. The coupling mechanism may mate with a corresponding coupling component of the connectable cart, so that when the cart AGV 116 is under or adjacent to the connectable cart, the coupling mechanism may attach the connectable cart, for instance, in response to a signal received from the dispatch system 106. The cart AGV 116 may then pull or push the connectable cart through an operating environment, such as the order fulfillment center described in reference to FIG. 3A.

At 418, a picker client device 144 may provide a dashboard for cart building and receiving input for the same. For instance, the REX 132 may output a dashboard embodied by a graphical user interface presented on a computing device, which may be part of the picking system 108, such as the picker client device 144. The dashboard may indicate that the connectable cart is coupled with the cart AGV 116 and the labels have been assigned to the connectable cart.

At 420, the REX 132 may release the cart to have items picked onto it. For instance, the REX 132 may release the cart AGV 116 to navigate away from the induction area 308 to, for instance, the pick-to-cart area 302 based on an automatic determination that the cart AGV 116 is coupled to the connectable cart and the labels have been scanned into the cart record, or, for instance, based on a confirmatory input from a picker into the dashboard.

In some implementations, the REX 132 may receive, via the dashboard, a confirmation input from a picker that the cart AGV 116 is connected to the connectable cart and is ready to be released to pick. For example, the cart AGV 116 may be released to navigate to the pick-to-cart area 302 where items will be picked to the cartons on the cart AGV 116.

At 422, the REX 132 or other system may create tasks for cart AGVs 116 and/or picking AGVs 114, for example, using a navigation marker database. For instance, the task list may include a series of items to be picked, and the order and AGV assigned to perform the picks may be selected based on the locations of items assigned to be picked. For instance, the task list may include a series of items and corresponding locations and/or times in a pick-to-cart area 302 for picking using a cart AGV 116. The task list may also or alternatively include a series of items and corresponding locations in a high-density storage area 304 for retrieval using a picking AGV 114.

At 424, the cart AGV 116 may navigate to a next location. For instance, the cart AGV 116 may navigate to a sequential location in a task list, which sequential location may correspond to a location of an item in an order assigned to the cart/cart AGV 116. For instance, a REX 132 may instruct the cart AGV 116 to navigate (e.g., propel the connectable cart) to a location of a first item in the pick-to-cart area 302 based on a task list or itinerary. For example, the cart AGV 116 may navigate to a bay (e.g., a shelving bay) where a pick-to-cart item in one or more orders assigned to the cart is stored. For example, a guidance system coupled with the cart AGV 116 may read navigation markers and follow them until a destination defined by the REX 132 (or another component of the system 100) is reached. For instance, the cart AGV 116 may stop adjacent to the location where the item is stored, (e.g., in front of a storage shelving unit) in a zone, or near a picker.

At 426, the picking system 108 may assign one or more pickers to one or more zones or may define one or more zones in space and/or time, for example, as described in further detail above.

At 428, the picking system 108 may create tasks for one or more pickers, for example, corresponding to the AGV tasks and picks in the assigned zone at a time when the AGV 116 or carton is located within the zone. For instance, as described in further detail above, the picking system 108 may determine one or more individual pick tasks that may indicate an item, location of an item, timing, place (e.g., carton on a cart AGV 116) to place the item, label to place on the item, or other task to perform.

At 430, the picking system 108 may transmit data to a picker client device 144 describing one or more tasks, as described above and, at 432, the picker client device 144 may receive the task(s) and provide the same to pickers. In some implementations, the picking system 108 may output an instruction to a picker on an output device, the instruction identifying the item and quantity to be picked at that location. In some implementations, the picking system 108 may coordinate lights or screens on the cart indicating into which carton an item is to be placed and/or lights on a shelving bay/location of the item in the pick-to-cart area 302 indicating the storage location of the item. Other systems, such as audio (e.g., pick-to-voice), a mobile computing device indicating the location of the item, etc., are possible.

At 434, the picker client device 144 may receive input from a picker confirming a pick or other task and may transmit corresponding confirmation data to the picking system 108. For instance, the picker client device 144 may receive a confirmation message input from the picker confirming the pick into a computing device of the picking system 108. The input may include one or more messages indicating that an item (e.g., a specific item in one of the orders assigned to the cart) has been picked from the location and put on the cart AGV 116, for example, into a carton on the connectable cart coupled with the cart AGV 116.

In some implementations, at 436, the picking system 108 may update the picks or tasks in a task list of the picker, carton, cart, cart AGV 116, or overall system 100. The picking system 108 may send a message to the REX 132 indicating that the pick(s) at the location have been completed, in response to which the REX 132 may instruct a cart AGV 116, conveyor, or other equipment to move to a next location (e.g., at 424. For instance, at 438, the picking system 108 may determine whether there are additional pick-to-cart tasks and, if yes, the method may proceed to 424.

In some implementations, if there are no additional pick-to-cart tasks for a cart, the picking system 108 may determine, at 440 whether there are pick-cell tasks (e.g., tasks or picks performed at a pick cell station 316). The REX 132 may determine whether there are picks at the pick-cell station 316 assigned to one or more of the cartons assigned to the cart/cart AGV 116. For instance, the REX 132 may determine whether there are items in the high-density storage area 304 also assigned to one or more cartons transported by the cart AGV 116. For example, if one or more of the orders assigned to the cart AGV 116 (e.g., as described above) includes an item that is to be retrieved by a picking AGV 114, the REX 132 may direct the cart AGV 116 to navigate to the pick-cell station 316 where the item from the picking AGV 114 may be picked to the cart AGV 116 (e.g., to a carton in the connectable cart).

If there are pick-cell tasks, the cart AGV 116, transporting the cart and/or cartons, may navigate to a determined pick-cell station 316 at 442. In a similar way to the pick-cell station, the picking system 108 may transmit instructions to a picker client device 144 at the pick-cell station 316.

In response to a negative determination at 440, the method may continue to 450 in FIG. 4C, for example. For instance, at 450, the REX 132 may instruct the cart AGV 116 to go to the finalizing area 314, and at 452, the cart AGV 116 may navigate to the finalizing area 314.

In some implementations, at 454, the cart AGV 116 may detach from the connectable cart in the finalizing area 314. In some implementations, the cart AGV 116 may then return to an induction area 308 to attach to another connectable cart.

At 456, the picker client device 144 (e.g., in association with the picking system 108) may provide a dashboard for finalizing and receive input for the same. For instance, an associate in the finalizing area 314 may finalize the cart using the dashboard. In some implementations, the associate may remove the carton(s) from the connectable cart, verify the contents a carton, close the cartons, place the cartons on a conveyer to go to a shipping area, and confirm on the dashboard that the cartons have been finalized.

In some implementations, the finalizing area 314 or a portion thereof may be treated, by the picking system 108 or other system, as a zone with which a picker and/or tasks may be associated, as described above. For instance, a picker may be instructed to check the contents and/or place certain items, packing materials, labels, etc., on a carton, among other potential tasks.

At 458, in some implementations, the picker may use the dashboard or other input method to release the cart (e.g., the connectable cart) to induction, in response to which the REX 132 directs a cart AGV 116 (e.g., a next available or other cart AGV 116) to attach to the released cart in the finalizing area at 460. At 462, the cart AGV 116 may navigate to the induction area 308 with the cart, although other implementations are possible, as described elsewhere herein.

Figure 5B:
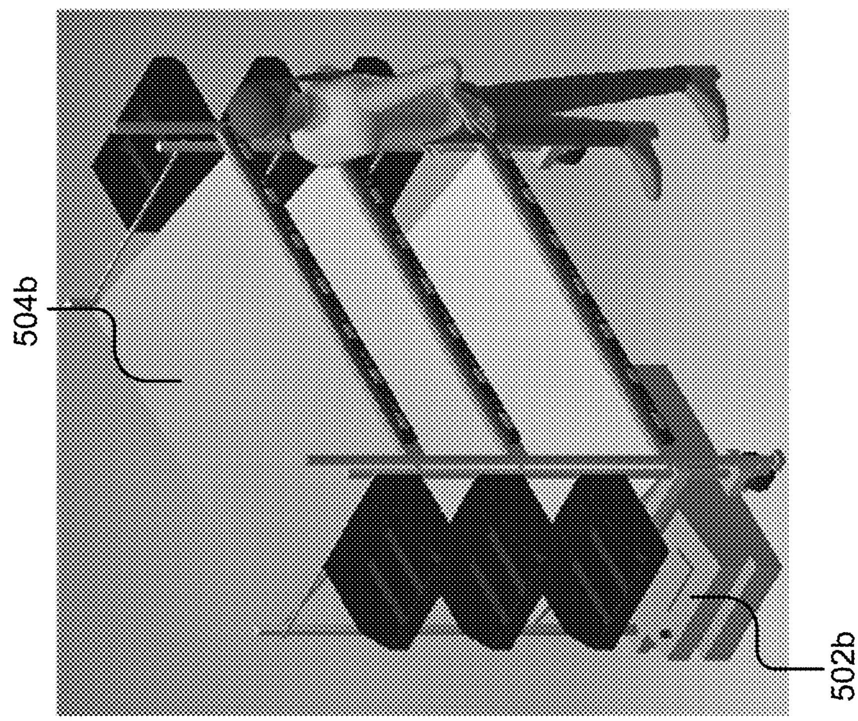
FIGS. 5A and 5B are illustrations of example cart automated guided vehicles.
Figure 5A:
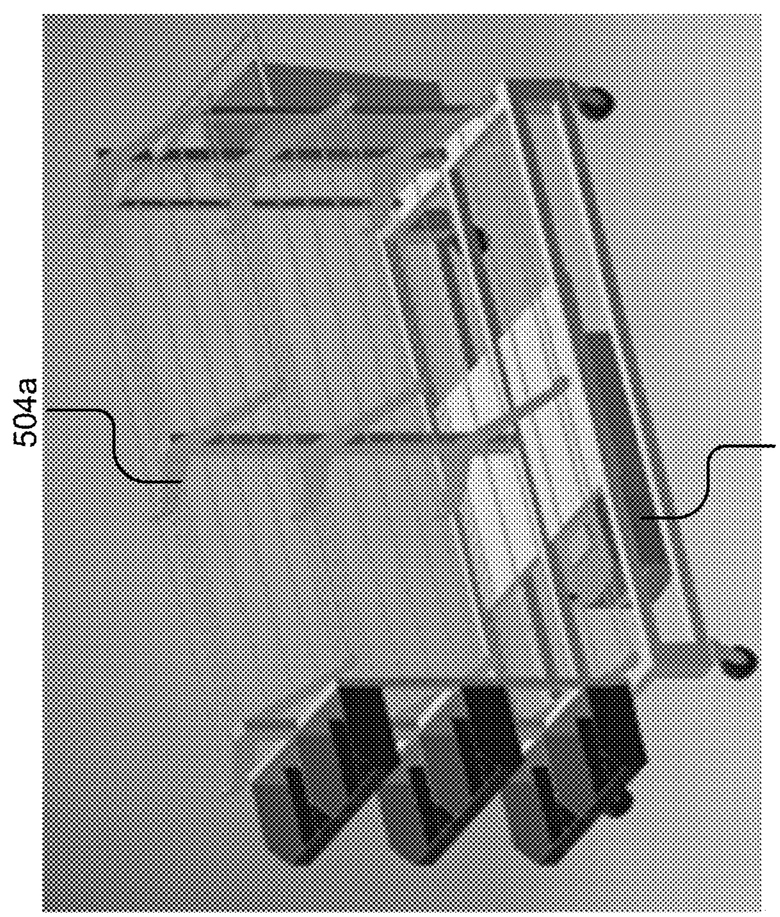
Figure 6:
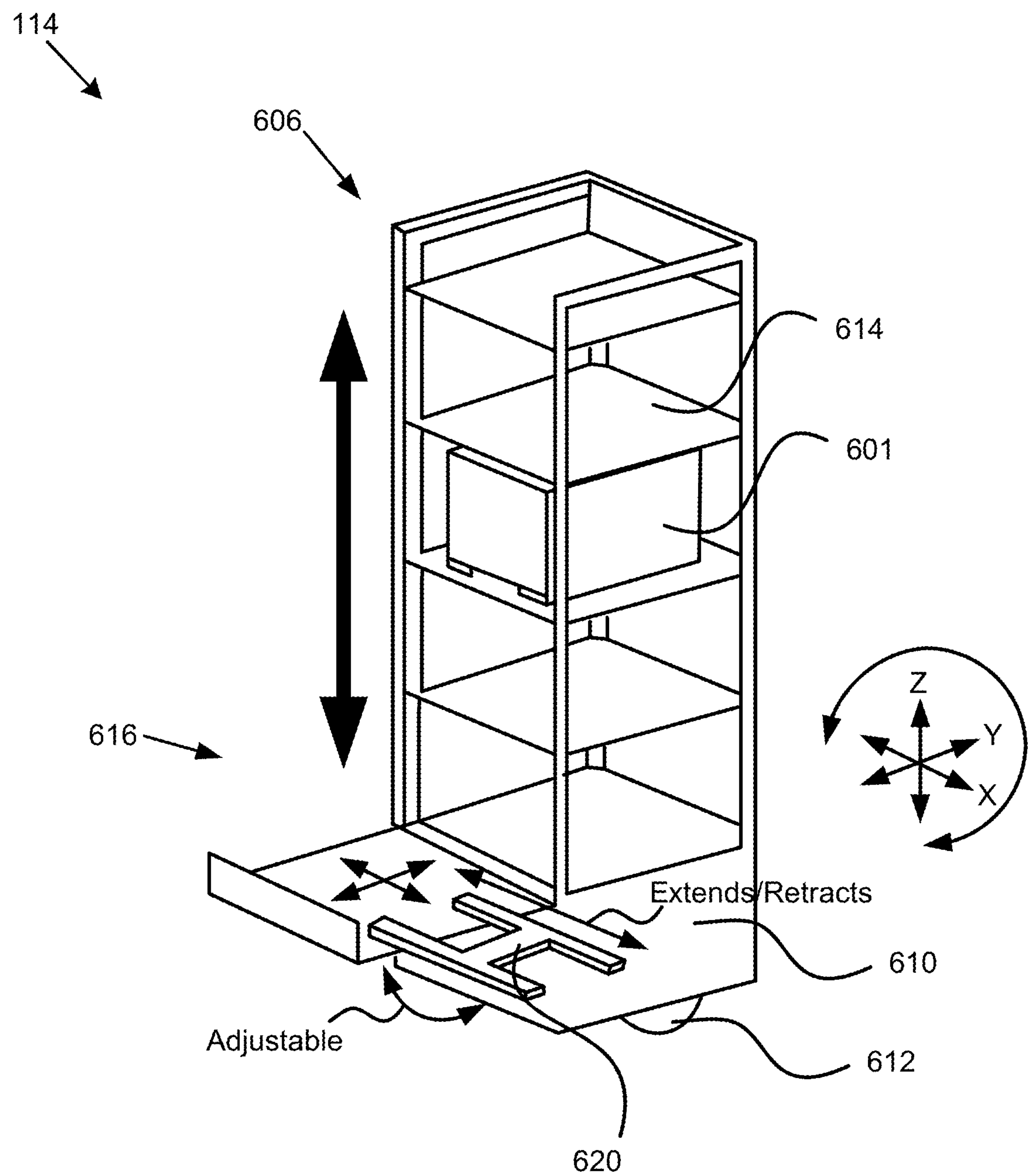
FIG. 6 is an illustration of an example picking automated guided vehicle.

FIGS. 5A and 5B are illustrations of example cart AGVs 502*a* and 502*b* (e.g., also referred to herein as 116). The example cart AGVs may include a cart AGV 502 or robot configured to autonomously transport pick-to-cart items, as described above. The cart AGV 502 may include or be adapted to autonomously transport a carton holder 504*a* or 504*b* (e.g., a cart or shelves) that is adapted to hold cartons (not shown in FIG. 5A or 5B). For example, a cart AGV 502 may push/pull a carton holder 504, which may correspond to a connectable cart. In some implementations, a carton may be a box placed on a shelf of the carton holder 504.

As illustrated in FIGS. 5A and 5B, the cart AGV 502 may include a substantially rectangular body and may include or be coupleable to a connectable cart having shelves (e.g., the carton holder 504*a* or 504*b*). The cart AGV 502 may couple to a connectable cart via a coupling mechanism and matching coupling component (e.g., a latch mechanism coupling the cart AGV 502 to the connectable cart). In some instances, the shelves may be angled for easy loading of cartons to be filled with picked items.

FIG. 6 depicts an example picking AGV 114, which may include an AGV body 610, a drive unit 612 housed within or coupled to the body 610, a power source (not shown) housed within or coupled to the body 610, an AGV item storage rack 606 with one or more AGV shelves 614, a CHM 616, a carrying surface 620, a guidance system (not shown), and one or more controllers (not shown), although other configurations are possible and contemplated herein. In some implementations, the picking AGV 114 or components, attributes, or features thereof may be used as a cart AGV 116. For instance, the cart AGV 116 may have a body 610, drive unit 612, power source, shelving, guidance system, etc.

The body 610 may include a front, a rear opposing the front, a left side extending from the front to the rear, and a right side opposing the left side and extending from the front to the rear. While various shapes and construction materials to the body 610 are possible, the body 610 may be configured to fit between rows of storage shelving in a high-density storage area 304. The body 610 may be configured to house a drive unit 612, power source, controller, and/or other components of the picking AGV 114.

The drive unit 612 may be coupled to the body 610 and configured to receive power from the power source to provide motive force to the picking AGV 114 and propel the picking AGV 114 within an operating environment. In some implementations, the drive unit 612 may receive instructions from one or more controllers instructing the drive unit 612 to cause the picking AGV 114 to move forward, backward, sideways, turn, or perform another movement. In some implementations, the drive unit 612 may include electric motors and wheels, although other configurations, such as treads are possible.

The drive unit 612 may be wirelessly coupled via a controller to a wireless interface and a wireless communications network to receive control signals from the dispatch system 106 and/or other components of the system 100.

The power source may be coupled to the components of the picking AGV 114 to provide power to the components, for example, the power source may provide power to the CHM 616, the drive unit 612, a controller, or another component of the picking AGV 114. The power source may include a battery, a wire, contact track in the operating environment, induction charger, alternator or gas generator, etc.

Some implementations of the picking AGV 114 may include an AGV item storage rack 606 (also referred to as AGV rack 606). While the AGV rack 606 is illustrated as coupled to the top of the body 610, other configurations are possible, for example, the AGV rack 606 may be coupled in front of, behind, to the side of, or even towed or pushed by the picking AGV 114. The AGV rack 606 may be positioned proximate to the CHM 616, so that the shelves 614 are within reach of the CHM 616 for the CHM 616 to place items on the shelves 614.

The container handling mechanism or CHM 616 may include an extender for extending a carrying surface 620 from a picking AGV 114 to a storage shelving unit that is separate from the picking AGV 114. The CHM 616 may have three or more degrees of freedom to move the carrying surface 620 along three or more axes thereby allowing the CHM 616 to retrieve an item from a first target shelving unit using the carrying surface 620 and the three or more degrees of freedom and place the item on a second target shelving unit.

In some implementations, the picking AGV 114 may include a scanner coupled with the carrying surface 620, CHM 616, etc., that can read signatures or markers to determine location. For example, the scanner may be an optical scanner configured to read visual identifiers (e.g., labels including a QR code, bar code, etc.) to determine which shelf 614 the CHM 616 or the carrying surface 620 is aligned with. The optical scanner may scan a shelf marker on one or more of the AGV shelf 614 or a detached storage shelf. The shelf marker may indicate a position and/or identification code of shelves and/or modular storage units 601, for example.

In some implementations, the carrying surface 620 may be adapted to interface with a modular storage unit 601. For example, the carrying surface 620 is compatibly engageable with a handling component of the modular storage unit 601 to lift the modular storage unit 601 from the separate shelving unit, retain the modular storage unit 601 during handling, and place the modular storage unit 601 on the one of the shelves 614 of the AGV rack 606.

The picking AGV 114 may include a guidance system that determines a location of the picking AGV 114 within the operating environment. For instance, the guidance system may include one or more sensors that detect and process navigation markers (e.g., QR codes, RFID labels, etc.) to locate the picking AGV 114 as the picking AGV 114 traverses the operating environment. The guidance system may be coupled to a controller of the picking AGV 114, which may, in some instances, include local object detection intelligence and processing to avoid collision with other objects (e.g., AGVs, humans, items, storage shelving units, etc.) in the operating environment.

The picking AGV 114 may include one or more controllers coupled with the guidance system, CHM 616, drive unit 612, dispatch system 106, etc., to perform the operations described herein. For instance, the one or more controllers may receive a signal from the REX 132 (e.g., via the dispatch system 106) and signal the drive unit 612 to propel the picking AGV 114. The one or more controllers may communicate with the guidance system to determine a location of the picking AGV 114 within the operating environment and, using the drive unit 612, navigate through the operating environment. The one or more controllers may receive a signal from the REX 132 indicating to retrieve a particular item from a target storage unit, in response to which, the one or more controllers may instruct the drive unit 612 to position the CHM 616 adjacent to the target shelving unit using the current location determined by the guidance system and then direct the CHM 616 to retrieve the item.

Figure 7:
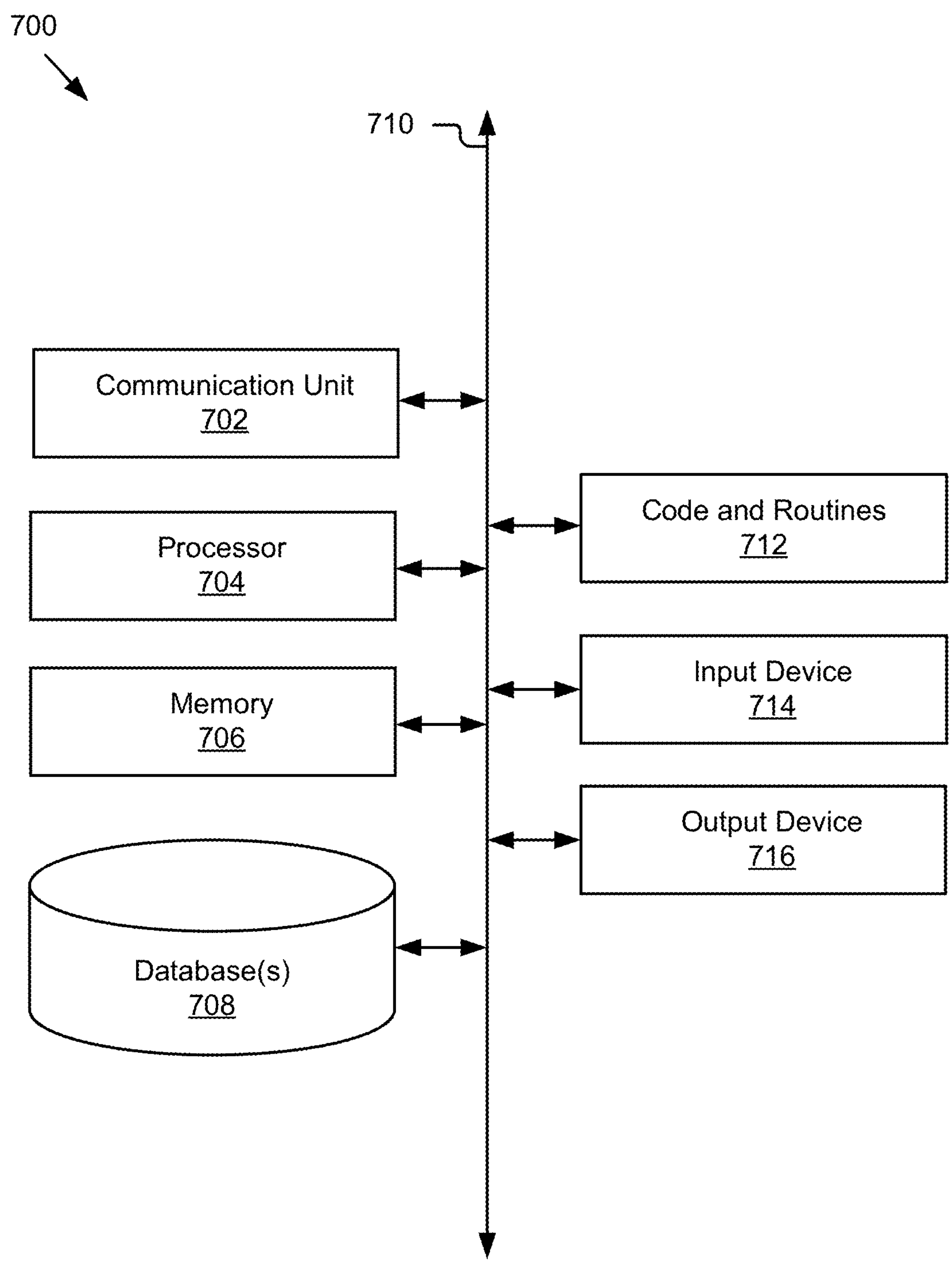
FIG. 7 is a block diagram illustrating an example computing device.

FIG. 7 is a block diagram illustrating an example computing system 700. The example computing system 700 may correspond to a WES 102, a WMS 104, a dispatch system 106, a picking system 108, a REX 132, or a picker client device 144, or a component thereof, for example.

The code and routines 712 may include computer logic executable by the processor 704 on a computing system 700 to provide for to provide the functionality described in reference to one or more of the components of the system 100 and/or the operations herein.

As depicted, the computing system 700 may include a processor 704, a memory 706, a communication unit 702, an output device 716, an input device 714, and database(s) 708, which may be communicatively coupled by a communication bus 710. The computing system 700 depicted in FIG. 7 is provided by way of example and it should be understood that it may take other forms and include additional or fewer components without departing from the scope of the present disclosure. Various components of the computing devices may be coupled for communication using a variety of communication protocols and/or technologies including, for instance, communication buses, software communication mechanisms, computer networks, etc. While not shown, the computing system 700 may include various operating systems, sensors, additional processors, and other physical configurations. Although, for purposes of clarity, FIG. 7 only shows a single processor 704, memory 706, communication unit 702, etc., it should be understood that the computing system 700 may include a plurality of one or more of these components.

The processor 704 may execute software instructions by performing various input, logical, and/or mathematical operations. The processor 704 may have various computing architectures to method data signals including, for example, a complex instruction set computer (CISC) architecture, a reduced instruction set computer (RISC) architecture, and/or an architecture implementing a combination of instruction sets. The processor 704 may be physical and/or virtual, and may include a single core or plurality of processing units and/or cores. In some implementations, the processor 704 may be capable of generating and providing electronic display signals to a display device, supporting the display of images, capturing and transmitting images, performing complex tasks including various types of feature extraction and sampling, etc. In some implementations, the processor 704 may be coupled to the memory 706 via the bus 710 to access data and instructions therefrom and store data therein. The bus 710 may couple the processor 704 to the other components of the computing system 700 including, for example, the memory 706, the communication unit 702, the input device 714, the output device 716, and the database(s) 708.

The memory 706 may store and provide access to data to the other components of the computing system 700. The memory 706 may be included in a single computing device or a plurality of computing devices. In some implementations, the memory 706 may store instructions and/or data that may be executed by the processor 704. For example, the memory 706 may store the code and routines 712, such as components of the system 100, described above. The memory 706 is also capable of storing other instructions and data, including, for example, an operating system, hardware drivers, other software applications, databases, etc. The memory 706 may be coupled to the bus 710 for communication with the processor 704 and the other components of computing system 700.

The memory 706 may include a non-transitory computer-usable (e.g., readable, writeable, etc.) medium, which can be any non-transitory apparatus or device that can contain, store, communicate, propagate or transport instructions, data, computer programs, software, code, routines, etc., for processing by or in connection with the processor 704. In some implementations, the memory 706 may include one or more of volatile memory and non-volatile memory (e.g., RAM, ROM, hard disk, optical disk, etc.). It should be understood that the memory 706 may be a single device or may include multiple types of devices and configurations.

The bus 710 can include a communication bus for transferring data between components of a computing device or between computing devices, a network bus system including a network or portions thereof, a processor mesh, a combination thereof, etc. The software communication mechanism can include and/or facilitate, for example, inter-method communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 702 may include one or more interface devices (I/F) for wired and wireless connectivity among the components of the system 100. For instance, the communication unit 702 may include various types known connectivity and interface options. The communication unit 702 may be coupled to the other components of the computing system 700 via the bus 710. The communication unit 702 may be electronically communicatively coupled to a network (e.g., wiredly, wirelessly, etc.). In some implementations, the communication unit 702 can link the processor 704 to a network, which may in turn be coupled to other processing systems. The communication unit 702 can provide other connections to a network and to other entities of the system 700 using various standard communication protocols.

The input device 714 may include any device for inputting information into the computing system 700. In some implementations, the input device 714 may include one or more peripheral devices. For example, the input device 714 may include a keyboard, a pointing device, microphone, an image/video capture device (e.g., camera), a touch-screen display integrated with the output device 716, etc.

The output device 716 may be any device capable of outputting information from the computing system 700. The output device 716 may include one or more of a display (LCD, OLED, etc.), a printer, a 3D printer, a haptic device, audio reproduction device, touch-screen display, etc. In some implementations, the output device is a display which may display electronic images and data output by the computing system 700 for presentation to a user, such as a picker or associate in the order fulfillment center. In some implementations, the computing system 700 may include a graphics adapter (not shown) for rendering and outputting the images and data for presentation on output device 716. The graphics adapter (not shown) may be a separate processing device including a separate processor and memory (not shown) or may be integrated with the processor 704 and memory 706.

The database(s) are information source(s) for storing and providing access to data. The data stored by the database(s) 708 may organized and queried using various criteria including any type of data stored by them, such as the data in the data store 120 and other data discussed herein. The database(s) 708 may include file systems, data tables, documents, databases, or other organized collections of data. Examples of the types of data stored by the database(s) 708 may include the data described herein, for example, in reference to the data store 120.

The database(s) 708 may be included in the computing system 700 or in another computing system and/or storage system distinct from but coupled to or accessible by the computing system 700. The database(s) 708 can include one or more non-transitory computer-readable mediums for storing the data, such as the data store 120. In some implementations, the database(s) 708 may be incorporated with the memory 706 or may be distinct therefrom. In some implementations, the database(s) 708 may store data associated with a database management system (DBMS) operable on the computing system 700. For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations.

It should be noted that the components described herein may be further delineated or changed without departing from the techniques described herein. For example, the processes described throughout this disclosure may be performed by fewer, additional, or different components.

It should be understood that the methods described herein are provided by way of example, and that variations and combinations of these methods, as well as other methods, are contemplated. For example, in some implementations, at least a portion of one or more of the methods represent various segments of one or more larger methods and may be concatenated or various steps of these methods may be combined to produce other methods which are encompassed by the present disclosure. Additionally, it should be understood that various operations in the methods are iterative, and thus repeated as many times as necessary generate the results described herein. Further the ordering of the operations in the methods is provided by way of example and it should be understood that various operations may occur earlier and/or later in the method without departing from the scope thereof.

In the above description, for purposes of explanation, numerous specific details are set forth in order to provide a thorough understanding of the present disclosure. However, it should be understood that the technology described herein can be practiced without these specific details in various cases. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms such as "processing," "computing," "calculating," "determining," "displaying," or the like, refer to the action and methods of a computer system that manipulates and transforms data represented as physical (electronic) quantities within the computer system's registers and memories into other data similarly represented as physical quantities within the computer system memories or registers or other such information storage, transmission or display devices.

A data processing system suitable for storing and/or executing program code, such as the computing system and/or devices discussed herein, may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input or I/O devices can be coupled to the system either directly or through intervening I/O controllers. The data processing system may include an apparatus may be specially constructed for the required purposes, or it may comprise a general-purpose computer selectively activated or reconfigured by a computer program stored in the computer.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects may not be mandatory or significant, and the mechanisms that implement the specification or its features may have different names, divisions, and/or formats.

Furthermore, the modules, routines, features, attributes, methodologies and other aspects of the disclosure can be implemented as software, hardware, firmware, or any combination of the foregoing. The technology can also take the form of a computer program product accessible from a computer-usable or computer-readable medium providing program code for use by or in connection with a computer or any instruction execution system. Wherever a component, an example of which is a module or engine, of the specification is implemented as software, the component can be implemented as a standalone program, as part of a larger program, as a plurality of separate programs, as a statically or dynamically linked library, as a kernel loadable module, as firmware, as resident software, as microcode, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A method comprising:

generating, by one or more processors, a picking itinerary based on one or more locations of items in an order fulfillment center and received order data identifying the items, the picking itinerary including pick-to-cart routing for one or more carts;

transporting, by the one or more processors, the one or more carts in the order fulfillment center according to the pick-to-cart routing;

determining, by the one or more processors, a zone of the order fulfillment center to which to assign a picker based on the picking itinerary including:

determining, by the one or more processors, a zone score for each of a plurality of zones, the plurality of zones including the zone; and assigning, by the one or more processors, the picker to the zone based on the zone scores;

determining, by the one or more processors, one or more tasks for the picker located in the zone, the one or more tasks including picking at least one of the items from the one or more locations to the one or more carts in association with the pick-to-cart routing;

outputting, by the one or more processors, pick instructions to a picker client device directing the picker to perform the one or more tasks; and responsive to the one or more tasks being performed, transporting, by the one or more processors, the one or more carts to a defined point in the order fulfillment center.

2. The method of claim 1, wherein transporting the one or more carts in the order fulfillment center includes autonomously navigating a cart autonomous guided vehicle (AGV) according to the pick-to-cart routing using a guidance system.

3. The method of claim 1, wherein determining the zone of the order fulfillment center to which to assign the picker is based on the one or more locations of the items, the one or more tasks including picking a subset of the items, which are located in the zone of the order fulfillment center.

4. The method of claim 1, wherein determining the zone score for each of the plurality of zones is based on a quantity of the one or more carts and a quantity of the one or more tasks.

5. The method of claim 4, wherein determining the zone score for each of the plurality of zones is further based on a distance between the one or more locations.

6. The method of claim 4, wherein determining the zone of the order fulfillment center is further based on locations of a plurality of pickers, the plurality of pickers including the picker.

7. The method of claim 1, wherein determining the zone of the order fulfillment center includes determining, by the one or more processors, one or more boundaries of the zone using a clustering algorithm.

8. The method of claim 1, further comprising:

outputting, by the one or more processors, zone instructions to the picker client device, the zone instructions directing the picker to move to the zone.

9. The method of claim 1, wherein the pick instructions include instructing the picker to retrieve the at least one of the items from the one or more locations and place the at least one of the items on a certain cart of the one or more carts in coordination with transportation of the certain cart to the zone by an AGV.

10. The method of claim 1, further comprising:

receiving, by the one or more processors, a confirmation message from the picker client device indicating that the one or more tasks have been completed; and in response to receiving the confirmation message, reassigning, by the one or more processors, the picker to a second zone of the order fulfillment center.

11. The method of claim 1, further comprising:

inducting, by the one or more processors, an order into a storage fetching system based on the order data identifying the items in orders to be fulfilled at the order fulfillment center.

12. A system comprising:

a processor; and a memory storing instructions that, when executed by the processor, cause the system to:

generate a picking itinerary based on one or more locations of items in an order fulfillment center and received order data identifying the items, the picking itinerary including pick-to-cart routing for one or more carts;

transport the one or more carts in the order fulfillment center according to the pick-to-cart routing;

determine a zone of the order fulfillment center to which to assign a picker based on the picking itinerary including determining one or more boundaries of the zone using a clustering algorithm;

determine one or more tasks for the picker located in the zone, the one or more tasks including picking at least one of the items from the one or more locations to the one or more carts in association with the pick-to-cart routing;

output pick instructions to a picker client device directing the picker to perform the one or more tasks; and responsive to the one or more tasks being performed, transport the one or more carts to a defined point in the order fulfillment center.

13. The system of claim 12, wherein transporting the one or more carts in the order fulfillment center includes autonomously navigating a cart autonomous guided vehicle (AGV) according to the pick-to-cart routing using a guidance system.

14. The system of claim 12, wherein determining the zone of the order fulfillment center to which to assign the picker is based on the one or more locations of the items, the one or more tasks including picking a subset of the items, which are located in the zone of the order fulfillment center.

15. The system of claim 12, wherein the instructions further cause the system to:

determine a zone score for each of a plurality of zones, the plurality of zones including the zone; and assign the picker to the zone based on the zone scores.

16. The system of claim 15, wherein determining the zone score for each of the plurality of zones is based on a quantity of the one or more carts and a quantity of the one or more tasks.

17. The system of claim 16, wherein determining the zone score for each of the plurality of zones is further based on a distance between the one or more locations.

18. The system of claim 16, wherein determining the zone of the order fulfillment center is further based on locations of a plurality of pickers, the plurality of pickers including the picker.

19. A system comprising:

an automated guided vehicle (AGV) adapted to transport a cart in an order fulfillment center according to pick-to-cart routing;

a picker client device adapted to output pick instructions directing a picker to perform a task; and a processor performing operations including:

generating a picking itinerary based on one or more locations of items in the order fulfillment center and received order data identifying the items, the picking itinerary including the pick-to-cart routing for the AGV;

determining a zone of the order fulfillment center to which to assign the picker based on the picking itinerary including:

determining a zone score for each of a plurality of zones, the plurality of zones including the zone; and assigning the picker to the zone based on the zone scores;

determining the task located in the zone for the picker, the task including picking at least one of the items from the one or more locations to the cart in coordination with transportation of the cart by the AGV;

transmitting the pick instructions to the picker client device directing the picker to perform the task; and responsive to the task being performed, transporting the cart to a defined point by the AGV.

20. The system of claim 19, wherein determining the zone of the order fulfillment center further includes determining one or more boundaries of the zone using a clustering algorithm.

* * * * *